United States Patent [19]
Muto

[11] Patent Number: 6,144,627
[45] Date of Patent: Nov. 7, 2000

[54] DATA RECORDING AND REPRODUCING APPARATUS AND METHOD WITH PHASE ERROR DETECTION

[75] Inventor: Takayasu Muto, Kanagawa, Japan

[73] Assignee: Sony Corporation, Tokyo, Japan

[21] Appl. No.: 08/964,723

[22] Filed: Nov. 5, 1997

Related U.S. Application Data

[63] Continuation of application No. PCT/JP97/00735, Mar. 10, 1997.

[30] Foreign Application Priority Data

Mar. 8, 1996 [JP] Japan ................................. 8-051942

[51] Int. Cl.[7] .................................................. G11B 5/09
[52] U.S. Cl. .................................. 369/47; 369/50; 369/54
[58] Field of Search ................................. 369/47, 48, 50, 369/54, 58, 124, 44.25, 44.27, 44.28; 360/78.01, 78.04, 78.14, 51, 52

[56] References Cited

U.S. PATENT DOCUMENTS

| | | | |
|---|---|---|---|
| 5,436,770 | 7/1995 | Muto et al. | 360/51 |
| 5,523,987 | 6/1996 | Muto | 369/32 |
| 5,535,183 | 7/1996 | Miura et al. | 369/50 X |

FOREIGN PATENT DOCUMENTS

| | | | |
|---|---|---|---|
| 3-116443 | 5/1991 | Japan | G11B 7/00 |
| 3-156774 | 7/1991 | Japan | G11B 20/14 |
| 4-105270 | 4/1992 | Japan | G11B 20/12 |
| 4-149862 | 5/1992 | Japan | G11B 19/28 |
| 4-295666 | 10/1992 | Japan | G11B 19/12 |
| 6-275022 | 9/1994 | Japan | G11B 20/10 |
| 6-333325 | 12/1994 | Japan | G11B 19/02 |
| 8-315517 | 11/1996 | Japan | G11B 20/14 |

*Primary Examiner*—Paul W. Huber
*Attorney, Agent, or Firm*—Limbach & Limbach L.L.P.; Seong-Kun Oh

[57] ABSTRACT

Even if an external disturbance resulting from a defect on a magneto-optical disk disturbs a loop for generating a reference clock and consequently a phase error is increased, it is possible to prevent data from being recorded on a magneto-optical disk by using an abnormal reference clock. A disk apparatus according to the present invention includes a rotating and driving means for rotating and driving a disk, data recording/reproducing means having a head which can be moved in the radial direction of the disk for recording and reproducing data on and from the disk, reference clock information generating means for generating a reference clock information utilized when data is recorded on and reproduced from the disk, clock control means for generating a phase error information indicative of a phase error between a phase information obtained based on rotation of the disk and the reference clock information and for controlling the reference clock generating means based on the phase error information, threshold value discriminating means for discriminating whether the phase error exceeds a predetermined threshold value, and data recording/reproduction control means for controlling the data recording/reproducing means based on an output result of the threshold value discriminating means.

164 Claims, 8 Drawing Sheets

DATA RECORDING AND REPRODUCING APPARATUS AND METHOD WITH PHASE ERROR DETECTION

This application is a continuation of international application serial PCT/JP97/00735, filed Mar. 10, 1997, pending.

TECHNICAL FIELD

The present invention relates to a disk apparatus for recording or reproducing information data on or from a disk-like recording medium such as a read-only optical disk, a write-once optical disk, a recordable magneto-optical disk or the like, and a method therefor.

BACKGROUND ART

A disk-like recording medium used for recording and reproducing information signal by using a light beam (hereinafter simply referred to as an optical disk) includes a read-only optical disk such as a so-called compact disc, a write-once optical disk on which data can be recorded only once, and a recordable type optical disk from which data can be not only reproduced and but also which data can be recorded and erased.

The read-only optical disk has, on one surface, a track where concave and convex patterns, i.e., phase pits are centrically or spirally formed in response to recorded information signal. Specifically, Such optical disk is formed of a disk substrate made of synthetic resin material such as poly carbonate, PMMA or the like having light transmittance, a reflective film made of Al, Au or the like and formed so as to cover the phase pits formed on one surface of the disk substrate, and a protective layer formed so as to cover the reflective film in order to protect the reflective film.

When an information signal is reproduced from the read-only optical disk, a light beam from a laser light source is irradiated from the disk substrate side with being converged by an objective lens. A luminous flux of reflected light modulated depending upon the phase pit of this optical disk is detected by a photodetctor, for example, and converted into a detection signal having a signal level in response to a light amount of the luminous flux of the reflected light. Thus, a reproduced signal of the information signal recorded on the read-only optical disk is obtained.

A magneto-optical disk employing a vertically magnetized recording material and so on is known as the recordable type optical disk. The magneto-optical disk is formed of a disk substrate made of synthetic resin material such as polycarbonate, PMMA or the like having light transmittance and having a guide groove for guiding the light beam formed on one surface thereof, a recording layer formed so as to cover the above guide groove and made of a vertically magnetized recording material such as Te, Fe, Co or the like, and a protective layer formed so as to cover the above recording layer in order to protect the recording layer.

When a desired information data is recorded on this magneto-optical disk, the desired information data is subjected to a predetermined modulation to thereby generate a recording signal. This generated recording signal is supplied to a magnetic-field generating device, for example. Then, the magnetic-field generating device applies an external magnetic field corresponding to a recording signal to the magneto-optical disk, thereby a portion irradiated with the laser light from an optical head a portion that is heated to a temperature higher than a Curie temperature) of a vertical magnetized film (recording layer) of the magneto-optical disk being magnetized in response to the recording signal. Thus, the information data is recorded.

When the information data is reproduced from the magneto-optical disk, similar to the reproduction of the above read-only optical disk, a light beam from a laser light source is irradiated thereon from the side of the disk substrate with its being converged by an objective lens. A recording signal recorded on the magneto-optical signal is reproduced by detecting a Kerr rotation angle in the luminous flux of the reflected light modulated by a recording layer of the optical disk, and the reproduced signal is subjected to a predetermined demodulation. Thus, the information data is reproduced.

The write-once optical disk includes one of a recording system utilizing physical and chemical change of a pigment, one of a recording system in which an aperture is formed through a single-layer film, one of a recording system in which an aperture is formed through a multilayer film, one of a phase change recording system, one of a bubble forming recording system and so on. When the write-once optical disk is reproduced, similar to reproduction of the above read-only optical disk, a light beam (having a weak optical output for reproduction) from a laser light source is irradiated from the disk substrate side with it being converged by an objective lens. A luminous flux of reflected light modulated depending upon the previously recorded phase pit is detected by a photodetctor, for example, and converted into a detection signal having a signal level in response to a light amount of the luminous flux of the reflected light. Thus, a reproduced signal of the information signal recorded on the read-only optical disk is obtained.

When the information data is recorded on and reproduced from the magneto-optical disk, it is necessary to precisely set at least a phase of a channel clock (sampling clock) used for modulation and demodulation processing timings in order to precisely record the above recording signal on the magneto-optical disk and to obtain precise information data from the signal reproduced from the magneto-optical disk.

The assignee of the present invention has proposed a system of detecting a clock of an optical disk which enables precise detection of the channel clock (see Japanese laid-open patent publication No. H3-156774, the disclosure of which is incorporated herein by reference).

FIG. 6 shows an arrangement employed when the system for detecting the clock of the optical disk is applied to a magneto-optical disk recording and reproducing apparatus. Specifically, as shown in FIG. 7, the magneto-optical disk used in the magneto-optical disk recording and reproducing apparatus has servo areas in each of which a servo pattern having a pair of wobble pits WP1, WP2 displaced respectively toward inner and outer periphery sides from a center of a track TR centrically formed and a clock pit CP positioned at the head of a pair of wobble pits WP1, WP2 are disposed at a predetermined interval.

There are one thousand and four hundred servo areas in one round of the magneto-optical disk. Data area is provided between a servo area and the next servo area. In this data area, a sub code such as a synchronization data, an address data or the like and the recording signal subjected to a predetermined modulation are magneto-optically recorded.

The magneto-optical recording and reproducing apparatus shown in FIG. 6 has a spindle motor for rotating a magneto-optical disk 101 having the above format at a CAV (constant angular velocity) similar to that employed when the recording signal is recorded, an optical system 102 for irradiating laser light on the magneto-optical disk 101 rotated by the above spindle motor 100 and for detecting return light therefrom to output it as a reproduced signal, an RF amplifier 105 for amplifying the reproduced signal from the optical system 102 with a predetermined gain, an A/D converter 106 for converting the amplified reproduced signal from the RF amplifier 105 into a digital reproduced signal, a latch circuit 107 for holding the reproduced data from the above A/D converter 106 at a predetermined latch timing, a phase error detector 108 for detecting a phase error of the channel clock relative to the reproduced data based on respective values of the reproduced data held by the latch circuit 107 to output it as a phase error detection data, a D/A converter 109 for converting the phase error data from the above phase error detector 108 into an analog phase error detection from the above phase error detection signal, a phase compensator circuit 110 for removing a high-band noise component of the phase error detection signal from the D/A converter 109 to thereby keep stability of a PLL, a voltage-controlled oscillator (VCO) 111 for changing an oscillation frequency in response to a voltage level of the phase error detection signal supplied from the above D/A converter 109 through the phase compensator circuit 110, and a feed-back loop for feeding the channel clock output from the VCO 111 back to the A/D converter 106 at a first stage.

In the conventional recording and reproducing apparatus, before the recording signal recorded on the magneto-optical disk 101 is reproduced or before the recording signal is recorded on the magneto-optical disk 101, a phase based on detection of the servo pattern and the phase of the channel clock are previously set so as to be matched with each other (servo pattern detection mode). When the mode is brought into servo pattern detection mode, the optical system 102 irradiates the laser light on the magneto-optical disk 101 rotated by the spindle motor 100 and detects the returning light therefrom to subject it to photoelectric conversion, thereby the servo pattern and the recording signal recorded on the magneto-optical disk 101 are reproduced therefrom. The reproduced signal is amplified by the RF amplifier 105 at the succeeding stage and then supplied to the A/D converter 106, wherein the reproduced signal is converted into digital reproduced data. The A/D converter 106 samples the above amplified reproduced signal with the channel clock supplied from the VCO 111 through the feed-back loop to thereby convert the reproduced data into the digital reproduced data.

Since, as shown in FIG. 7, the above servo pattern formed in the servo area is formed of a pair of wobble pits WP1 and WP2 and one clock pit CP, as shown in FIG. 8A, a waveform of the reproduced data of the above servo pattern is a waveform continuously having a signal waveform SW1 of the clock pit CP having a very high level at the head thereof and signal waveforms SW2 and SW3 of the two wobble pits WP1, WP2 each having a level lower than that of the signal waveform SW1 of the clock pit CP.

If the channel clock output from the VCO 111 has a precise phase and an operation of counting the above channel clock is started after the detection of the above servo pattern, then it is possible to precisely latch the servo pattern by latching the reproduced data from the A/D converter 106 when the count value becomes one value within the range from n to n+2 and n+5 to n+7.

Therefore, the conventional recording and reproducing apparatus is designed to incorporate a servo pattern detecting circuit, a counter and a latch pulse outputting circuit which are not shown. The servo pattern detecting circuit is a circuit for comparing data with respect to the servo pattern previously stored with the reproduced data from the A/D converter to thereby detect the servo pattern. The servo pattern detecting circuit detects the servo pattern to thereby output a detection pulse to the counter.

The counter is a circuit for resetting, based on an input of the detection pulse from the servo pattern detecting circuit, a count value thereof and for starting an operation of counting the above channel clock from this point.

The latch pulse outputting circuit is a circuit which incorporates a count value comparing circuit and which outputs to the latch circuit 107 a latch pulse at every time when the count value successively supplied thereto from the counter becomes a value within the range of from n to n+2 and the range of from n+5 to n+7.

The latch circuit 107 latches the reproduced data from the A/D converter 106 at a timing based on the input of the latch pulse successively supplied from the latch pulse outputting circuit, thereby data values at points indicated by points a1, a0, a2, c1, c0 c2 in FIG. 8A are held. These data values are supplied to the phase error detector 108 at the succeeding stage.

When supplied with the data value from the latch circuit 107, the phase error detector 108, by utilizing symmetry of each of the waveforms SW2 and SW3 at the two servo pits WP1 and WP2, detects a phase error of the channel clock relative to the reproduced data of the above servo pattern in accordance with the following equation (1) based on differences between levels at the points a1, a2 and the points c1, c2 which are respectively shoulder points located away from the points a0, c0 shown in FIG. 8 that are center points of the waveforms SW2 and Sw3 by one channel clock amount in both directions. Then, the phase error detector supplies the phase error as the phase error detection data to the D/A converter 109.

$$\text{phase error data} = [(a2-a1)+(c2-c1)]/2 \qquad (1)$$

The reproduced data of the servo pattern is also employed not only for generating the above phase error data but also for generating a tracking error signal, a detection signal of a mean level of wobble pits, a mirror-portion level detection signal and so on in accordance with the following equations (2) to (4).

$$\text{tracking error signal} = c0-a0 \qquad (2)$$

$$\text{mean level detection signal} = (a0+c0)/2 \qquad (3)$$

$$\text{mirror-portion level detection signal} = d0 \qquad (4)$$

The above D/A converter 109 converts the phase error detection data output from the phase error detector 108 into an analog signal to generate a phase error detection signal, and supplies it to the phase compensator circuit 110 at the succeeding stage. Te phase compensator circuit 110 is formed of an integrator, primary filter and so on, and removes the high-band noise component of the supplied phase error detection signal to thereby phase-compensate the phase error detection signal, and then supplies the phase-compensated phase error detection signal to the VCO 111 at the succeeding stage.

The VCO 111 can change its oscillation frequency based on the voltage level of the phase error detection signal, thereby feeding back to the A/D converter 106 through the feedback loop the channel clock having a frequency which permits the phase error of the channel clock relative to the reproduced data of the servo pattern to be set to zero.

Specifically, a block for generating the channel clock in the recording and reproducing apparatus for the magneto-optical disk 101 is arranged as a so-called PLL arrangement, and outputs the channel clock having a phase synchronized with the phase of the reproduced data of the above servo pattern.

The channel clock output from the above VCO 111 is also supplied to a demodulating circuit 103 of a data reproducing system in the recording and reproducing apparatus and to a modulating circuit (not shown) of the data recording system.

Thus, in the recording and reproducing apparatus, the VCO 111 outputs the channel clock having the phase synchronized with the phase of the reproduced data of the above servo pattern. Specifically, when an operation of locking the phase of the reproduced data of the servo pattern is finished, the servo pattern detection mode is finished, and then the processing proceeds to a reproduction mode for reproducing the recording signal recorded on the magneto-optical disk 101 or a recording mode for recording the recording signal on the magneto-optical disk 101.

When the processing of the recording and reproducing apparatus is brought into the reproduction mode, the recording signal recorded on the magneto-optical disk 101 is read out therefrom by the optical system 102. The reproduced signal from the optical system 102 is supplied through the RF amplifier 105 to the A/D converter 106 as described above and also to the demodulating circuit 103 in the data reproduction system.

The above A/D converter 106 samples the amplified reproduced signal from the RF amplifier 105 at a clock timing of the channel clock supplied thereto through the feed-back loop and converts it into the digital reproduced data to supply the latter to the latch circuit 107 at the succeeding stage. Thus, the latch circuit latches data with the respect to the servo pattern of the reproduced data. the phase error detector generates the phase error detection data based on the latch data. Based on the phase error detection data, the oscillation frequency of the VCO 111 is repeatedly and variably controlled.

The demodulating circuit 103 demodulates the amplified reproduced signal from the RF amplifier based on the channel clock from the VCO 111 to obtain information data, and outputs the information data through an output terminal 104 to an interface circuit connected to the host computer at the succeeding stage and to a D/A converter connected to a speaker apparatus at the succeeding stage.

When on the other hand the processing of the recording and reproducing apparatus is brought into the recording mode, the information data supplied from the host computer, for example, through the interface circuit is supplied to the modulating circuit. The modulating circuit modulates the information data from the interface circuit based on the channel clock from the VCO 111 to obtain the recording signal, and then supplies the recording signal to the external magnetic-field generating device. The external magnetic-field generating device changes a magnetization direction in response to the supplied recording signal, thereby the recording signal being recorded on the magneto-optical disk as the magnetization information.

At this time, the reproduced signal generated based on the returning light from the servo area detected by the optical system 102 is supplied through the RF amplifier 105 to the A/D converter 106. Similarly to the operation of the reproduction mode, the oscillation frequency of the VCO 111 is repeatedly and variably controlled based on the phase error detection data from the phase error detector 108.

As described above, since the phase of the channel clock output from the VCO 111 is synchronized with the phase of the above servo pattern, it is possible for the demodulating circuit 103 to precisely demodulate the reproduced signal , and also it is possible for the modulating circuit to precisely modulate the information data to obtain the recording signal.

However, it is sometimes observed that the magneto-optical disk has a defect produced on a servo pattern during its manufacturing process or under conditions of use thereof. If the servo pattern has any defect, it is difficult to precisely to detect the servo pattern.

If production of such defect disables the detection of the servo pattern or leads to imprecise detection thereof, then the phase of the channel clock is considerably mismatched with the phase of the reproduced data of the servo pattern, and hence the operation of latching the reproduced data by the latch circuit 107 is carried out at a position displaced from both of the shoulders of the data waveforms SW2, SW3 of the wobble pits WP1 and WP2 as shown in FIG. 8B.

In this state, it is not possible for the phase error detector 108 to generate the precise phase error detection data, and hence it becomes impossible for the VCO 111 to output the channel clock having the frequency precisely synchronized with the phase of the reproduced data of the servo pattern.

Since, as described above, the above channel clock is used when the information data is recorded on and reproduced from the magneto-optical disk 101, if the channel clock is not precise, then precise recording and reproduction may not be carried out.

In view of the above, it is an object of the present invention to provide a disk apparatus and recording and reproducing method therefor which, even if a disk-like recording medium has any defect and external disturbance of the defect disturbs a reference-clock generating loop (PLL) and increases the phase error, can detect a state in which the phase error is large and avoid an operation of recording data on the disk-like recording medium based on an abnormal reference clock.

It is another object of the present invention to provide a disk apparatus and recording and reproducing method therefor which, even if the external disturbance resulting from the defect on the disk-like recording medium leads to imprecise detection of the phase error, can prevent the above external disturbance from influencing generation of the reference clock and avoid generation of the reference clock having the imprecise phase.

It is further another object of the present invention to provide a disk apparatus and recording and reproducing method therefor which can take the difference between permissible phase errors at the inner and outer peripheries of the disk-like recording medium into account when the reference clock is generated and can carry out, in response to an access position to the disk-like recording medium, a most suitable interlocking processing (a processing for inhibiting an operation of recording data on the disk-like recording medium when the phase error exceeds the tolerance of the phase error).

DISCLOSURE OF THE INVENTION

A disk apparatus according to the present invention includes rotation means for rotating a disk, data recording/reproducing means having a head movable in the disk radius direction for recording and reproducing data on and from the disk, reference-clock information generating means for generating a reference clock information used when the data is recorded on and reproduced from the disk, clock control means for generating a phase error information indicating a phase error between a phase information resulting from rotation of this disk and this reference clock information and for controlling the reference clock generating means based on the phase error information, threshold value discriminating means for discriminating whether or not this phase error exceeds a predetermined threshold value, and data recording/reproduction control means for controlling the above data recording/reproducing means based on an output result of the threshold value discriminating means.

A recording and reproducing method according to the present invention is a recording and reproducing method for a disk apparatus for controlling a phase of a clock information based on the phase error between the phase information resulting from rotation of rotated disk and the clock information used for recording data and for recording and reproducing data on and from the disk, including a determining process of determining whether or not the phase error exceeds a predetermined threshold value, and a control process of controlling the disk apparatus based on the determined result obtained in the determining process.

A recording method according to the present invention is a recording method for a disk apparatus for controlling a phase of a clock information based on the phase error between the phase information resulting from rotation of rotated disk and the clock information used for recording data and for recording data on and from the disk, including a determining process of determining whether or not the phase error exceeds a predetermined threshold value, and a write inhibiting process of inhibiting the recording of data on the disk if it is determined in the determining process that the phase error exceeds the threshold value.

BEST MODE FOR CARRYING OUT THE INVENTION

Embodiments in which a data recording apparatus and a data recording method according to the present invention is applied to a magnetic-field modulation type recording and reproducing apparatus employing a magneto-optical disk as a disk-like recording medium will be described with reference to FIGS. 1 to 5.

Figure 7:
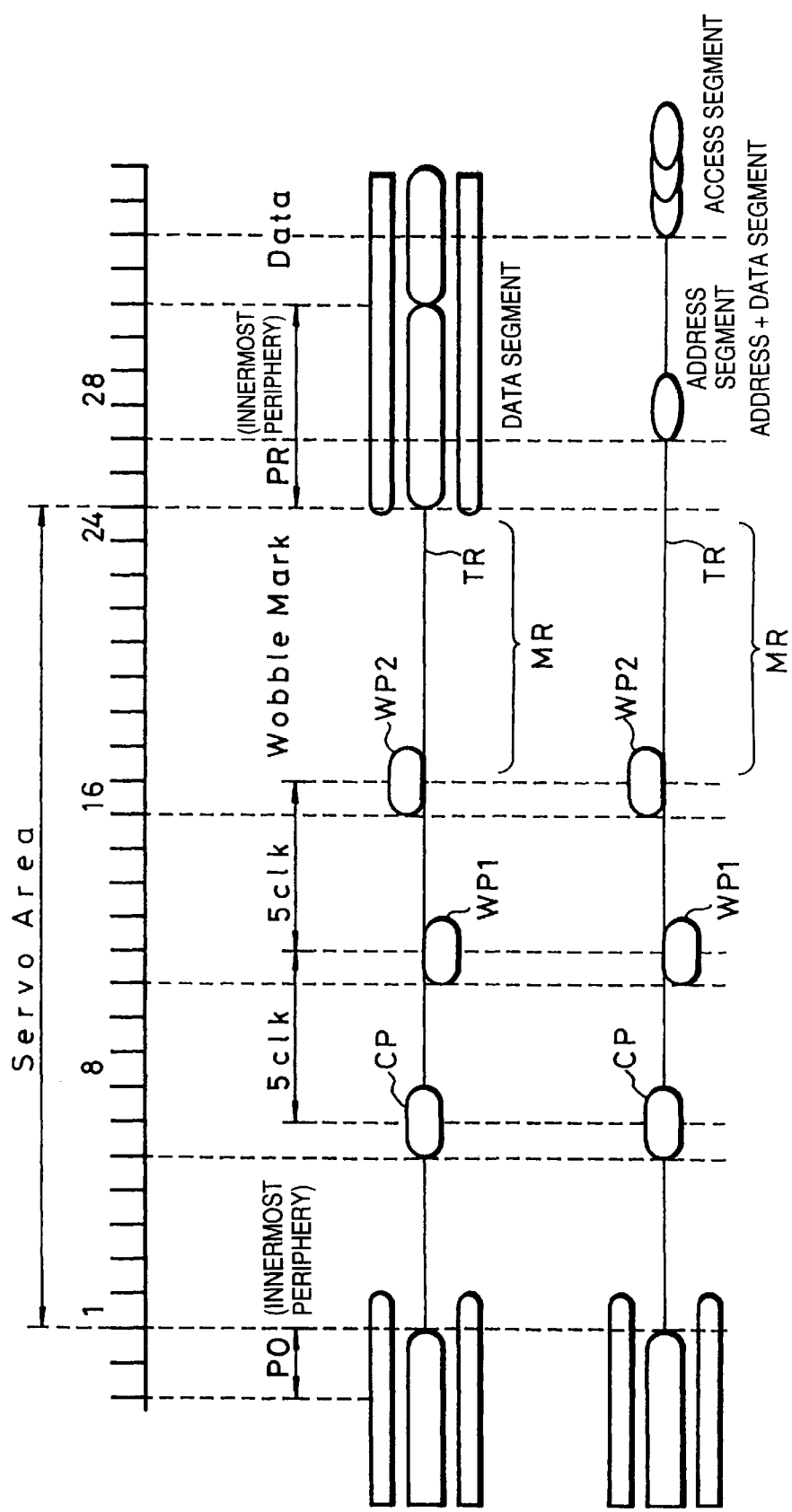
FIG. 7 is a schematic diagram showing a magneto-optical disk in which a servo pattern formed of wobble pits is recorded.

A magneto-optical disk D employed in the recording and reproducing apparatus according to the embodiments, as described with reference to FIG. 7, has servo areas located at a predetermined interval, in each of which, a servo pattern formed of a pair of wobble pits WP1, WP2 respectively, displaced toward inner and outer peripheries from the center of the track TR centrically formed and a clock pit CP located at the head of the pair of wobble pits WP1, WP2 is formed.

There are one thousand and four hundred servo areas in one round, for example, and a data area is provided between one servo area and the next servo area. In this data area, a synchronization data, an address data, a software data (including a program data, an audio data, and a video data) and so on are alternately recorded in the form of predetermined signals by utilizing a magneto-optical effect. The software data is managed based on a subcode such as the synchronization data, the address data or the like. Specifically, segments in each of which a software data is recorded by a predetermined unit are synchronized with one another by using the synchronization data, and the software data is accessed (recorded and reproduced) by a frame unit or a sector unit by using the address data. The subcode and the software data are totally called information data.

A recording and reproducing apparatus according to the first embodiment is basically arranged so as to have a spindle motor 1 for rotating the magneto-optical disk D having the above format at the CAV (constant angular velocity) similarly to a velocity employed when a recording signal is recorded, an optical system 2 for irradiating laser light L on the magneto-optical disk D rotated by the spindle motor 1 and for detecting returning light therefrom to output it as a reproduced signal, an RF amplifier 3 for amplifying the reproduced signal from the optical system 2 with a predetermined gain, a reproduction system having a demodulating circuit 4 for subjecting the amplified reproduced signal $S_{RF}$ from the RF amplifier 3 to a predetermined demodulation to output it as an information data Dr, a recording system having a modulating circuit 5 for modulating a recording data Dw supplied from an outside to obtain a signal to be recorded on the magneto-optical disk D, and a reference clock generating circuit 6 having a PLL arrangement for controlling the reference clock P by feeding it back based on a phase error of the reference clock P relative to the amplified reproduced signal $S_{RF}$ from the RF amplifier 3.

The reference clock generating circuit 6 has an A/D converter 11 for converting the amplified reproduced signal $S_{RF}$ from the RF amplifier 3 into a digital reproduced data $D_{RF}$ with reference to a clock timing of the reference clock P, a latch circuit 12 for holding the reproduced data $D_{RF}$ from the A/D converter 11 at a predetermined latch timing, a phase error detector 13 for detecting a phase error of the reference clock P relative to the reproduced data $D_{RF}$ with reference to respective values of the reproduced data held by the latch circuit 12 to output the phase error as a phase error detection data Dp, a D/A converter 14 for converting the phase error detection data Dp from the phase error detector 13 into an analog phase error detection signal Sp, a phase compensator circuit 15 for removing a high-band noise component of the phase error detection signal Sp from the D/A converter 14 to keep stability of a PLL, a voltage-controlled oscillator (VCO) 16 for changing its oscillation frequency in response to a voltage level of the phase error detection signal Sp supplied from the D/A converter 14 through the phase compensator circuit 15 to output it as the reference clock P, and a feedback loop 17 for feeding the reference clock P output from the VCO 16 back to the A/D converter 11 at the first stage.

Other than the above arrangement, the recording and reproducing apparatus according to the first embodiment has a servo pattern detecting circuit 21 for detecting the servo pattern based on the reproduced data $D_{RF}$ from the A/D converter 11 to set the latch timing used at the latch circuit 12 based on a timing of detection of the servo pattern, a recording control circuit 31 for selectively setting a state of writing data in the magneto-optical disk D in its inhibit state or its allowance state based on the phase error detection data Dp from the phase error detector 13, and a channel clock generating circuit 41 for generating a channel clock Pc used for data access based on the reference clock P output from the VCO 16 and a position information Sa of the optical system 2 relative to the magneto-optical disk D.

The channel clock generating circuit 41 has a multiple-of-inverse-number ratio setting circuit (frequency divider) 42 for setting a ratio of multiple of an inverse number 1/N based on the position information Sa of the optical system 2, and a PLL circuit 43 for generating the channel clock Pc having a frequency which is N times as high as the reference clock P based on the ratio of the multiple of an inverse number 1/N from the multiple-of-inverse-number ratio setting circuit 41.

When the optical system 2 is located at the inner periphery of the magneto-optical disk D, the multiple-of-inverse-number ratio setting circuit 41 outputs the ratio of multiple of an inverse number 1/N=1, and the PLL circuit 43 outputs the channel clock Pc having the same frequency as the frequency (e.g., 12 KHz) of the reference clock P based on the ratio. On the other hand, when the optical system 2 is located at the outer periphery of the magneto-optical disk D, the multiple-of-inverse-number ratio setting circuit 41 outputs the ratio of multiple of an inverse number 1/N=½, and the PLL circuit 43 outputs the channel clock Pc having the frequency (24 MHz) twice of the frequency of the reference clock P based on the ratio.

Specifically, the channel clock generating circuit 41 outputs the channel clock Pc having the frequency corresponding to the position of the optical system 2 relative to the magneto-optical disk D among the frequencies ranging from 12 MHz to 24 MHz.

The position information Sa of the optical system 2 supplied to the multiple-of-inverse-number ratio setting circuit 41 is obtained after a system controller 45 for controlling the recording and reproducing apparatus converts a position detection data Da from a linear encoder 44 used upon seek operation for disk access or an address signal included in the subcode Ds from the demodulating circuit 4 into a signal which can be processed by the multiple-of-inverse-number ratio setting circuit 41. The system controller 45 may calculate the ratio of multiple of inverse number directly from the position detection data Da and supply the ratio to the feedback loop of the PLL circuit 43.

The demodulating circuit 4 of the reproduction system is a circuit for demodulating the amplified reproduced signal $S_{RF}$ from the RF amplifier 3 based on the channel clock Pc output from the channel clock generating circuit 41 to obtain the information data Dr. The information data Dr from the demodulating circuit 4 is supplied to an interface circuit 52 connected to a host computer 51 through an output terminal at the succeeding stage and to a D/A converter (not shown) connected to a speaker apparatus (not shown) at the succeeding stage. Of the information data Dr supplied to the host computer 51 and so on, the subcode Ds such as the sector sync. signal, the sector address signal or the like is supplied to the system controller 45 and used thereby for controlling the rotation of the spindle motor 1 and a scanning position of the optical system 2 upon the seek operation.

The modulating circuit 5 in the recording system is a circuit for modulating the recording data Dw supplied from the host computer 51 through the interface circuit 52 based on the channel clock Pc from the channel clock generating circuit 41 to obtain the recording signal Sw. This recording system has an external magnetic field generating device 7 incorporating an excitation coil and a magnetic field generating circuit 8 other than the modulating circuit 5.

The magnetic-field generating circuit 8 is a circuit for switching a direction of an excitation current to be supplied to the excitation coil of the external magnetic field generating device 7 in response to the recording signal Sw output from the modulating circuit 5. Accordingly, a magnetic field generated by the external magnetic field generating device 7 is applied to the magneto-optical disk D, thereby a portion, irradiated with the laser light L from the optical system 2, of a vertical magnetization film (recording layer) of the magneto-optical disk D (a portion heated to a temperature exceeding the Curie temperature) being magnetized in response to the recording signal Sw.

The servo pattern detecting circuit 21 has a logic pattern data generating circuit 22, a servo pattern detector 23, a counter 24, a locking/unlocking detecting circuit 25, a segment counter 26, and a timing generator 27.

The logic pattern data generating circuit 22 is a circuit for subjecting the 8-bit reproduced data $D_{RF}$ from the A/D converter 11 of the reference clock generating circuit 6 to a logical calculation with reference to a threshold value to thereby generate a logic pattern data having a value of "1" or "0". Specifically, if a value of the 8-bit reproduced data from the A/D converter 11 exceeds the threshold value, a logic value "1" is generated, and if the value does not exceed the threshold value, a logic value of "0" is generated. Therefore, the logic pattern data generating circuit 22 converts the 8-bit reproduced data into a 1-bit logic value and successively outputs the latter.

The servo pattern detector 23, though not shown, incorporates a shift register successively supplied with the logic pattern from the logic pattern data generating circuit 22 by a bit unit and a reference register storing the logic pattern data corresponding to the servo pattern recorded in the magneto-optical disk D. The servo pattern detector compares respective logic values of the logic pattern data from the reference register and the logic pattern data successively supplied to the shift register, and outputs a servo pattern detection pulse Pa when all the comparison results show agreement of values.

The counter 24 is a circuit for counting the reference clock P from the reference clock generating circuit 6 and for outputting a first window pulse Pw1 based on the count value to the locking/unlocking detecting circuit 25 at the succeeding stage. The counter resets the count value by using the servo pattern detection pulse Pa output from the servo pattern detector 23 as a trigger and restarts counting the reference clock P from the reset point.

If the reference clock P output from the VCO 16 has a precise phase, a time for reproduction of one segment, i.e., a time from supply of the high-level servo pattern detection pulse Pa to the locking/unlocking detecting circuit 25 to the next supply of the high-level servo pattern detection pulse Pa thereto is a time corresponding to an amount of 296 reference clocks. Based on this, when the count value becomes 296 after the high-level servo pattern detection pulse Pa is supplied, the counter 24 generates the first window pulse Pw1 having a predetermined pulse width (a pulse width corresponding to the number of the reference clocks in the servo area) and outputs it to the locking/unlocking detecting circuit 25. When being supplied with the high-level servo pattern detection pulse Pa from the servo pattern detector 23 within the pulse width of the supplied window pulse Pw1, the locking/unlocking detecting circuit 25 outputs a high-level timing pulse Pb to the segment counter 26.

The segment counter 26 is supplied with the reference clock P from the VCO 16 similarly to the counter 24, and resets the count value by using the high-level timing pulse Pb from the locking/unlocking detecting circuit 25 as a trigger. The segment counter starts counting the reference clock P from the VCO 16 from the reset point and outputs the count value to the timing generator 27 at the succeeding stage.

When the count value supplied from the segment counter 26 becomes the values of n to n+2, n+5 to n+7 and n+10, the timing generator 27 generates the high-level latch pulses Pd and outputs them to the latch circuit 12.

Figure 8A:
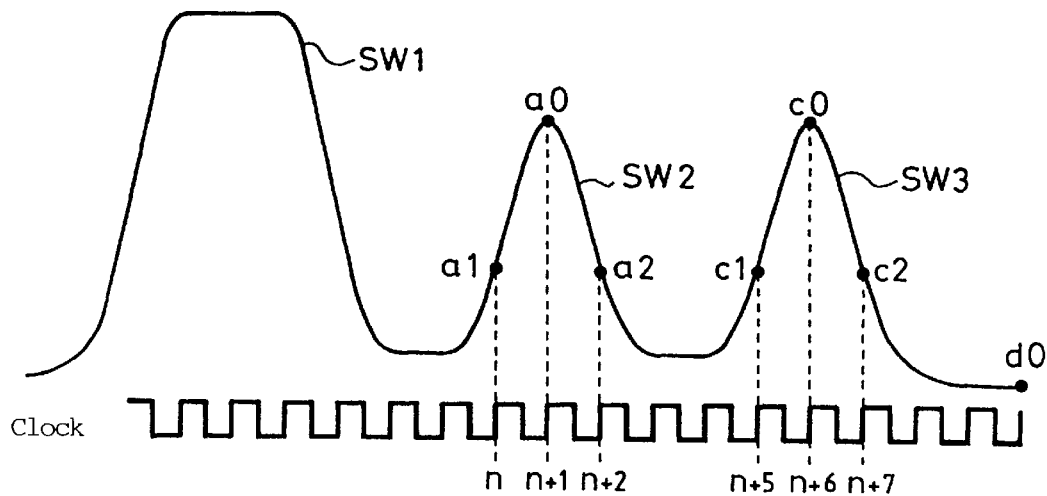
FIGS. 8(A) and 8(B) are waveform diagrams showing a servo pattern used to explain a calculation operation for generating a phase error detection data.
Figure 8B:
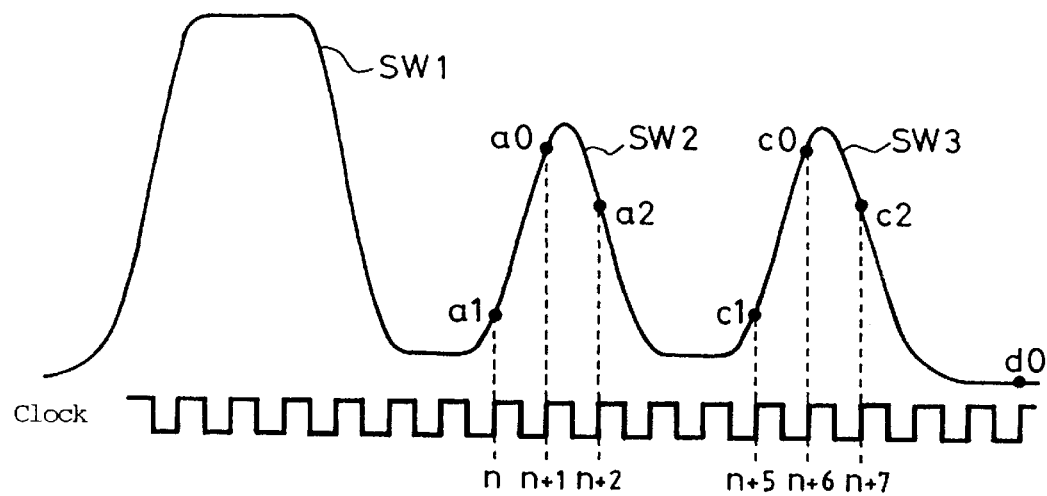

The latch circuit 12 holds the reproduced data $D_{RF}$ from the A/D converter 11 based on the supply of the latch pulses Pd from the timing generator 27, thereby latching the latch data at the points a1, a0, a2, c1, c0 and c2 and d0 of the servo pattern wave forms shown in FIG. 8A. The latch circuit supplies these latch data to the phase error detector 13 at the succeeding stage.

When being supplied with the latch data from the latch circuit 12, the phase error detector 1 utilizes symmetry of the two waveforms to detect the phase error of the reference clock P relative to the reproduced data $D_{RF}$ of the servo pattern in accordance with the following equation (5) based on the level differences between both shoulder points (points a1 and a2 and points c1 and c2 in FIG. 8A) displaced by one reference clock in both direction away from the center points (points a0 and c0 in FIG. 8A) of the waveforms SW2 and SW3. The phase error detector outputs this phase error to the DIA converter 14 as the phase error detection data Dp.

$$\text{phase error detection data} = [(a2-a1)+(c2-c1)]/2 \quad (5)$$

The reproduced data $D_{RF}$ of the servo pattern is also used for generating a tracking error signal, a detection signal for a mean level of the wobble pits WP1 and WP2, a detection signal of a level of a mirror portion provided between the servo pattern and the data area and so on in accordance with the following equations (6 to 8).

$$\text{tracking error signal} = c0-a0 \quad (6)$$

$$\text{mean level detection signal} = (a0+c0)/2 \quad (7)$$

$$\text{mirror portion level detection signal} = d0 \quad (8)$$

The timing generator 27 predicts, based on the count value from the segment counter 26, a time when the high-level servo pattern detection pulse Pb will be supplied next to the locking/unlocking detecting circuit 25. At the predicted time, e.g., a time when the count value becomes 296, for example, the timing generator generates a second window pulse Pw2 having a predetermined pulse width (a pulse width corresponding to the number of the reference clocks in the servo area) and outputs it to the locking/unlocking detecting circuit 25.

When the high-level servo pattern detection pulse Pa is supplied within the supplied second widow pulse Pw2, the locking/unlocking detecting circuit 25 outputs the high-level timing pulse Pb to the timing generator 27. In response to this output, the timing generator 27 outputs the latch pulse Pd to the latch circuit 12 at the timing, and the latch circuit holds the latch data at the predetermined points in the servo pattern. The above operations are repeatedly carried out.

As described above, since the servo pattern recorded on the magneto-optical disk D is not a so-called unique pattern which is different from the data pattern of the data area, the servo pattern is sometimes agreed with the data pattern reproduced from the data area. Therefore, if only the counter 24 is provided, the counter 24 might be reset even when the reproduced data in the data area is erroneously detected as the servo pattern. As a result, the first window pulse Pw1 output from the counter 24 is output at a wrong timing thereafter. In this case, it becomes impossible to match the phase based on a detection result of the servo pattern.

However, the recording and reproducing apparatus according to this embodiment has the segment counter 26 reset when the servo pattern detection pulses Pa are successively supplied within the first window pulse Pw1 and the next first window pulse Pw1, and the servo pattern detection pulse Pa is detected using the second window pulse Pw2 generated when the segment counter 26 has a predetermined count value. This, even if the servo pattern recorded on the magneto-optical disk D is not the unique pattern, it is possible to detect the servo pattern precisely.

Therefore, it is possible to supply the latch pulse Pd at a timing at which the latch circuit 12 can precisely latch the servo pattern.

Specifically, the reference clock generating circuit 6 drives the VCO 16 based on the phase error detection data Dp output from the phase error detector 13 and is continuously operated so that the value of the phase error detection data Dp becomes zero.

The recording control circuit 31 has a data write control circuit 32 for outputting a recording enable signal Swe to the optical system 2 based on a recording request command dw from the system controller 45, a comparator 34 for comparing the value (absolute value) of the phase error detection data Dp from the phase error detector 13 and an upper limit value from an upper-limit value storage register 33 described later on and for outputting an inhibit signal Sr when the value of the phase error detection data Dp exceeds the upper limit value, and a gate circuit 35 for inhibiting transmission of the recording enable signal Swe from the data write control circuit 32 to the optical system 2 based on the supply of the inhibit signal Sr from the comparator 34.

The data write control circuit 32 is brought into its input allowance state from a point when the recording request command dw is input thereto from the system controller 45 and outputs the recording enable signal Swe from a point (rising point) when a first channel clock Pc is input thereafter.

The optical system 2 sets the output of the laser light L emitted from a laser light source to a recording output based on the input of the recording enable signal Swe from the data write control circuit 32. The recording request command dw from the system controller 45 is also supplied to the magnetic field generating circuit 8. The magnetic field generating circuit 8 switches the direction of the current supplied to the excitation coil in the external magnetic field generating device 7 to the positive or negative direction based on the recording signal Sw from the modulating circuit 5.

Specifically, when the current flows through the excitation coil in the positive direction, a portion, which is heated to a temperature exceeding a Curie temperature by irradiation of the laser light from the optical head 2, of the recording layer of the magneto-optical disk D is magnetized in the positive direction, and when the current flows through the excitation coil in the negative direction, the portion is magnetized in the negative direction. Thereafter, when the reproduction laser light L from the optical head 2 is irradiated on the portion, a Kerr rotation angle in the luminous flux of reflected light modulated by the portion magnetized in the positive or negative direction is detected by a photodetector formed a pn junction photodiode incorporated in the optical head 2, thereby the reproduced signal obtained from a magnetization information recorded on the magneto-optical disk D is able to be obtained.

The recording enable signal Swe is also supplied to the interface circuit 52. The interface circuit 52 outputs the recording data Dw from the host computer 51 to the modulating circuit 5 during a period in which the recording enable signal Swe is input thereto. If the input of the recording enable single Swe is stopped even in the recording mode, the interface circuit temporarily stops transmission of the recording data Dw from the host computer 51 to the modulation circuit 5 until the next recording enable signal Swe is supplied.

The gate circuit 35 is formed of a two-input AND circuit having one input as a negative input. The inhibit signal Sr from the comparator 34 is input to the one negative input terminal, and a recording enable signal Swe from the data write control circuit 32 is input to the other input terminal.

Therefore, if the value (absolute value) of the phase error detection data Dp output from the phase error detector 13 is larger than the upper limit value stored in the register 33, then the comparator 34 outputs the inhibit signal Sr (a high-level signal having a logic value of "1"). Therefore, even if the recording enable signal Swe is output from the data write control circuit 32, the gate circuit 35 inhibits the transmission of the recording enable signal Swe to the optical system 2.

When the transmission of the recording enable signal Swe to the optical system 2 is inhibited, the laser light source of the optical system 2 emits the laser light L having the reproduction output and the interface circuit 52 is brought into its standby state in transmitting the recording data Dw to the modulating circuit 5.

In general, when the magneto-optical disk D has any defect, the external disturbance resulting from the defect makes it impossible or difficult to detect the servo pattern recorded on the magneto-optical disk D and hence the value (absolute value) of the phase error detection data Dp output from the phase error detector 13 becomes a considerably large value. Therefore, if the reference clock generating circuit 6 generates the reference clock P under such condition, the external disturbance resulting from the defect leads to the processing of generating the reference clock P and hence it is impossible to generate the reference clock P.

However, the recording control circuit 31 of the recording and reproducing apparatus according to the first embodiment functions as a circuit for determining whether or not the defect disables detection of the servo pattern or whether or not the defect disturbs the processing of generating the reference clock P. If the value of the phase error detection data Dp becomes larger than the upper limit value, the recording control circuit determines that the reference clock P is not precisely generated, and temporarily stops the operation of recording data on the magneto-optical disk D through the gate circuit 35 at the succeeding stage.

As described above, according to the recording and reproducing apparatus of this embodiment, even if the magneto-optical disk D has any defect and the external disturbance resulting from the defect disturbs the processing (loop) of genera ting the reference clock P in the reference clock generating circuit 6 and increases the value of the phase error detection data Dp output from the phase error detector 13, it is possible to avoid the operation of recording data on the magneto-optical disk D with an abnormal reference clock P (i.e., an abnormal channel clock Pc), and hence it is possible to improve the yield of the magneto-optical disk D seemingly.

Figure 1:
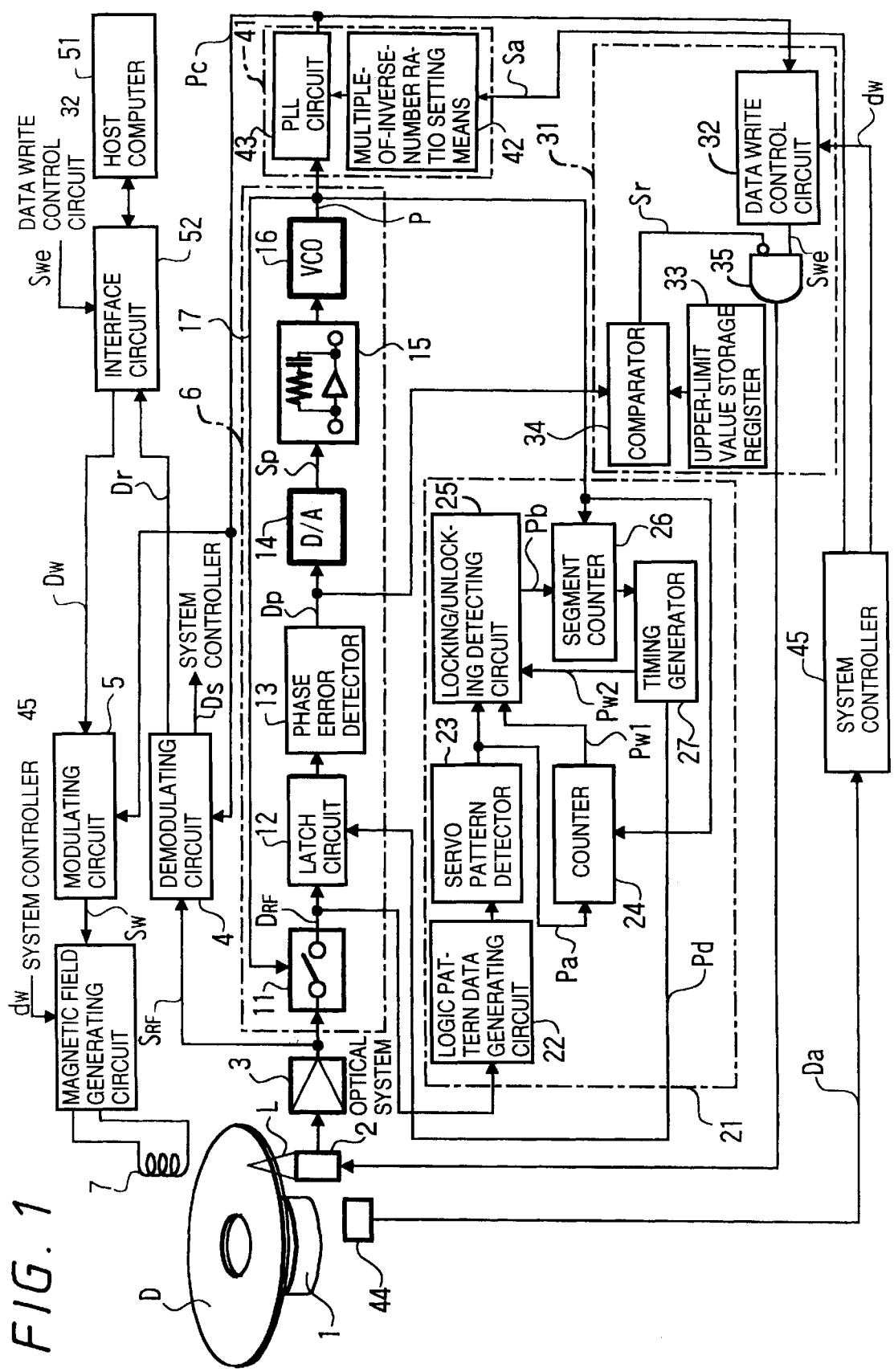
FIG. 1 is a diagram showing an arrangement of a recording and reproducing apparatus according to a first embodiment of the present invention.

A recording and reproducing apparatus according to a second embodiment will be described with reference to FIG. 2. Like parts and circuits corresponding to those in FIG. 1 are marked with the same reference numerals and need not be described in detail.

Figure 2:
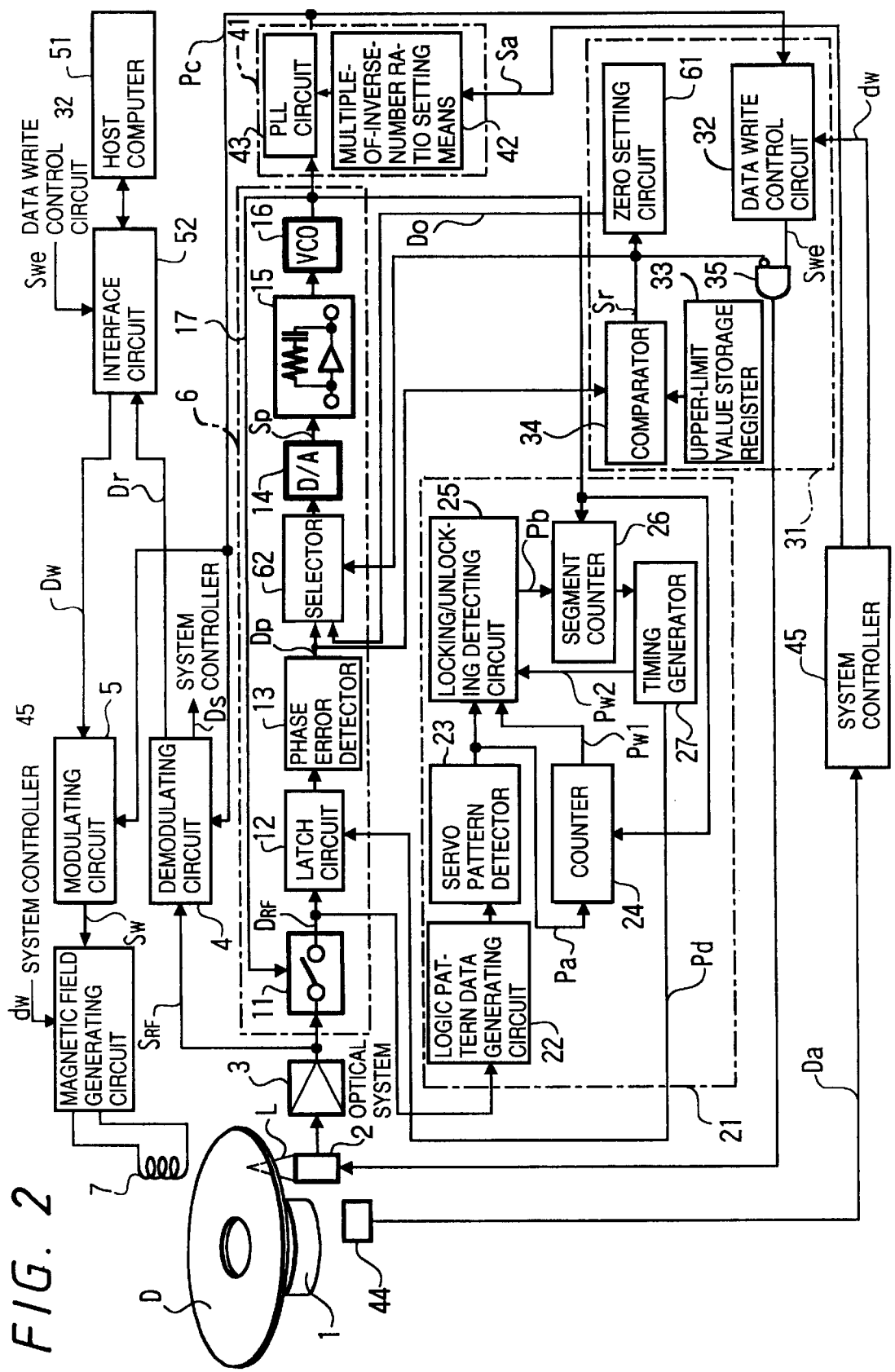
FIG. 2 is a diagram showing an arrangement of a recording and reproducing apparatus according to a second embodiment of the present invention.

As shown in FIG. 2, the recording and reproducing apparatus according to the second embodiment has substantially the same arrangement as that of the recording and reproducing apparatus according to the first embodiment but is different from the latter in that the former has a zero setting circuit 61 in a recording control circuit 31 and that a selector 62 is connected to the preceding stage of the D/A converter 14 of the reference clock generating circuit 6.

The zero setting circuit 61 is a circuit for outputting a zero data D0 based on the input of the inhibit signal Sr from inhibit signal Sr from the comparator 34 of the recording control circuit 31. When the inhibit signal Sr is not input, the selector 62 selects the phase error detection data Dp from the phase error detector 13 to output it to the D/A converter 14, and when the inhibit signal Sr is input, the zero setting circuit zero data D0 from the zero setting circuit 61 and output it to the D/A converter 14.

Specifically, according to the recording and reproducing apparatus of the second embodiment, when the magneto-optical disk D has any defect and it is determined that the external disturbance resulting from the defect makes it difficult or impossible to detect the servo pattern, the phase error=0 is forcibly set, thereby the processing of generating the reference clock P is carried out.

Specifically, when it is determined that the external disturbance resulting from the defect makes it difficult or impossible to detect the servo pattern, as described above, the value of the phase error detection data Dp becomes larger than the upper limit value, and the comparator 34 is inhibited from outputting the inhibit signal Sr. The zero setting circuit 61 outputs the zero data D0 based on the input of the inhibit signal Sr from the comparator 34, and the selector 62 switches, based on the input of the inhibit signal Sr, data to be transmitted to the D/A converter 14 at the succeeding stage from the phase error detection data Dp from the phase error detector 13 to the zero data D0 from the zero setting circuit 61.

Specifically, only when the external disturbance resulting from the defect of the magneto-optical disk D makes it impossible to detect the servo pattern, the zero setting circuit 61 supplies the zero data D0 as the phase error detection data Dp to the D/A converter 14 at the succeeding stage.

If the defect causes any external disturbance, the processing (PLL) of generating the reference clock P in the reference clock generating circuit 6 is considerably disturbed, and consequently a time required to precisely generate the reference clock P (i.e., correction time) becomes longer.

However, according to the recording and reproducing apparatus of the second embodiment, if the external disturbance resulting from the defect on the magneto-optical disk D makes the value of the phase error detection data Dp from the phase error detector 13 in the reference clock generating circuit 6 larger than the upper limit value, then the selector 62 of the reference clock generating circuit 6 and the zero setting circuit 61 of the recording control circuit 31 forcibly set the phase error to zero, and hence the processing (PLL) of generating the reference clock P in the reference clock generating circuit 6 is prevented from being considerably disturbed. Therefore, it is possible to shorten the time (correction time) required to precisely generate the reference clock when the servo pattern is normally detected at the next time, which leads to a high-speed access.

A recording and reproducing apparatus according to a third embodiment will be described with reference to FIG. 3. Like parts and circuits corresponding to those shown in FIG. 1 are marked with the same reference numerals and hence need not be described in detail.

Figure 3:
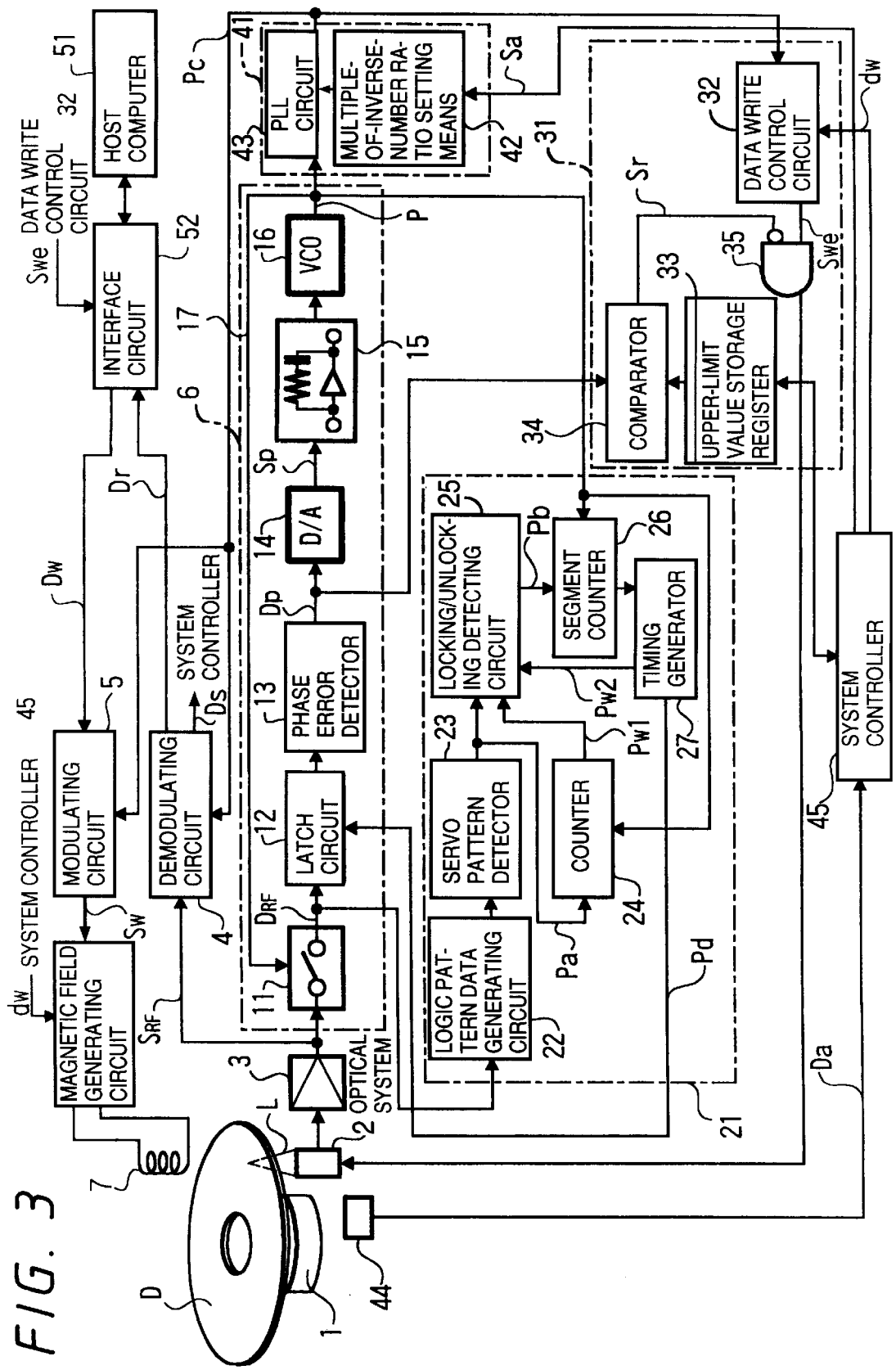
FIG. 3 is a diagram showing an arrangement of a recording and reproducing apparatus according to a third embodiment of the present invention.

As shown in FIG. 3, the recording and reproducing apparatus according to the third embodiment has substantially the same arrangement as the recording and reproducing apparatus according to the first embodiment but is different from the latter in that the former has a means (upper-limit value changing means) for adaptively changing the upper limit value stored in the upper-limit value storage register 33 depending upon information about the recording position of the optical system 2 relative to the magneto-optical disk D.

This upper-limit value changing means is incorporated in the system controller 45 as a hardware formed of a digital circuit or the like or as a software for letting a CPU execute programs indicating processings.

Figure 4:
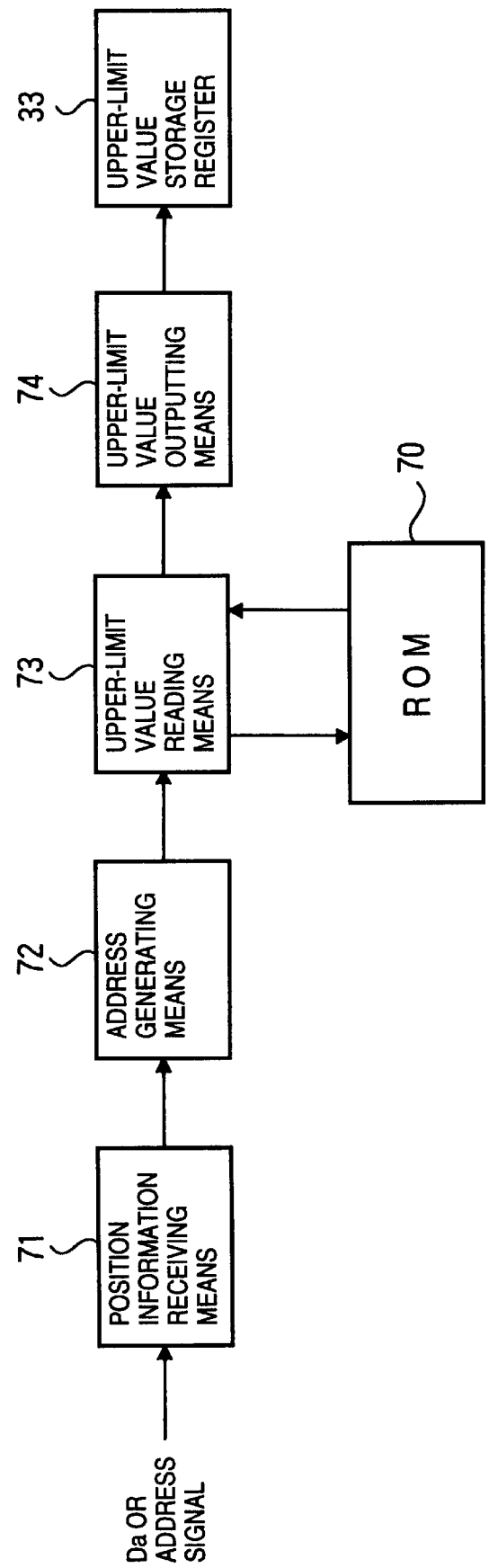
FIG. 4 is a function block diagram showing an arrangement of an upper-limit value changing means incorporated in a system controller.

FIG. 4 shows an arrangement of the above upper-limit value changing means. This upper-limit value changing means is arranged so as to derive the upper limit value from a record corresponding to an address generated based on the position information of the optical system 2 of an upper-limit value table (a table in which a large number of upper limit values are registered in an order of their addresses) previously registered in a ROM 70 incorporated in the system controller 45, and so as to output the derived upper limit value.

Specifically, as shown in FIG. 4, the upper-limit value changing means has a position information receiving means 71 for receiving the position information of the optical system 2, an address generating means 72 for generating an address of the corresponding record of the upper-limit value table based on the position information received by the position information receiving means 71, an upper-limit value reading means 73 for reading an upper-limit value from the record corresponding the address generated by the address generating means 72 from the upper-limit value table registered in the ROM 70, and an upper-limit value outputting means 74 for outputting the upper-limit value read out by the upper-limit value reading means 73 to the upper-limit value storage register 33.

A relationship between the position information of the optical system 2 and the upper-limit value will be described.

In general, when the rotation of the magneto-optical disk D is controlled so that a recording density should be substantially constant at the inner and outer peripheries of the magneto-optical disk D by setting rotation period thereof constant, a timing used to record data (i.e., a frequency of the channel clock Pc) must be high at the outer periphery of the magneto-optical disk and low at the inner periphery thereof, and hence a tolerance of the phase error detected at the outer periphery can be set only within the narrow range but that which is detected at the inner periphery can be set wider.

Therefore, the upper-limit values registered in the upper-value table are set so that they should be smaller as the optical system for detecting them is located closer to the outer periphery. Specifically, the upper-limit values are set so that the tolerance of the phase error becomes narrower as the optical system for detecting them is located closer to the outer periphery.

The position information of the optical system 2 is a position detection data Da from the linear encoder 44 used upon the seek operation for disk access or an address signal included in the subcode Ds from the demodulating circuit 4.

As described above, according to the recording and reproducing apparatus of the third embodiment, since the upper-limit value is changed in response to the position of the optical system 2 and set smaller as the optical system 2 is located closer to the outer periphery of the magneto-optical disk D, fluctuation of the phase error resulting from the defect and detected at the inner periphery side where the tolerance of the phase error can be set wide is prevented from being detected with the same detection accuracy as that used when the optical system is located at the outer periphery side. As a result, it is possible to prevent the probability (frequency) that the data is inhibited from being recorded on the magneto-optical disk D from being increased beyond necessity. This leads to an effective realization of the improvement of the yield of the magneto-optical disk D (improvement of productivity).

Figure 5:
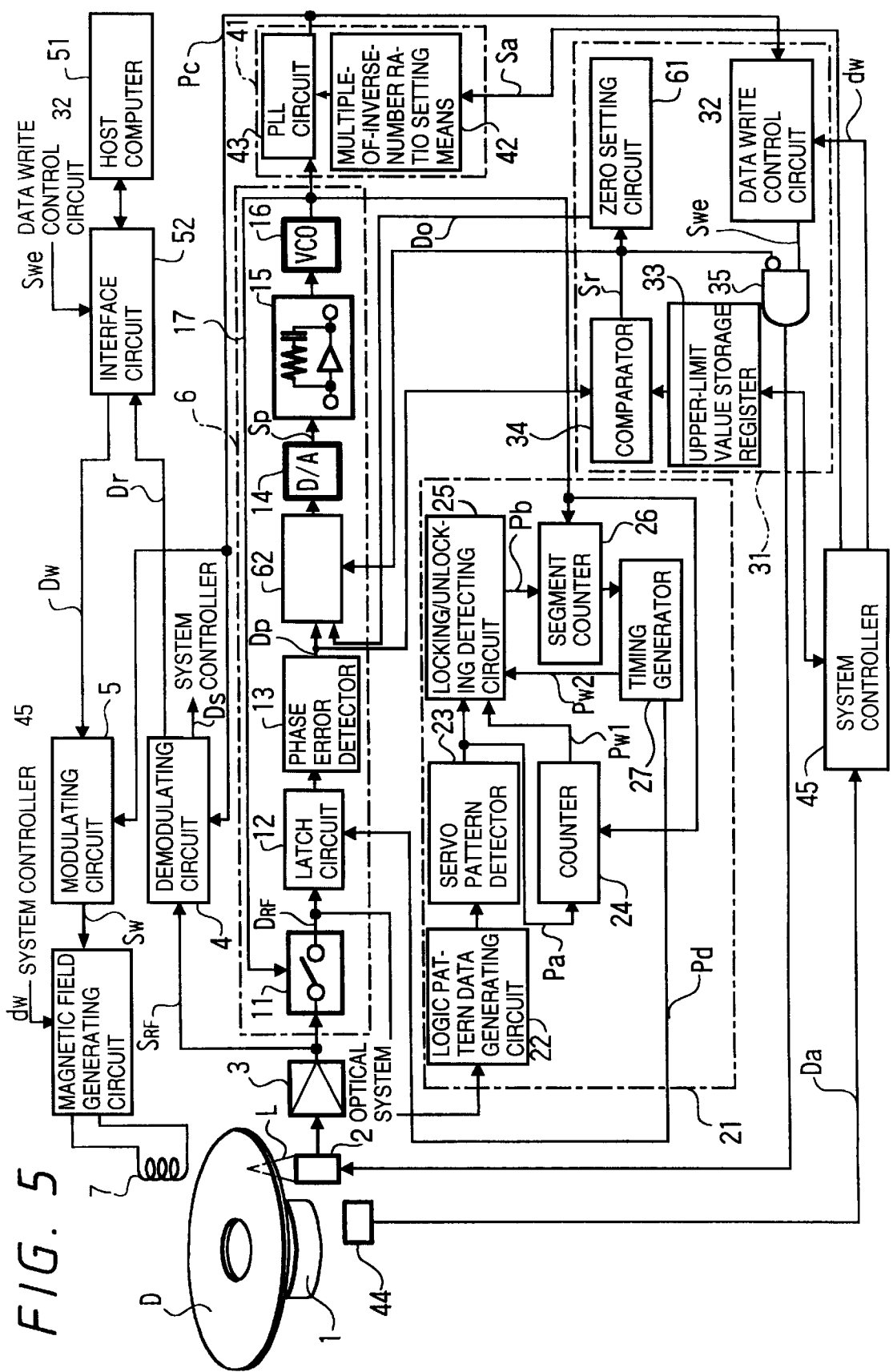
FIG. 5 is a diagram showing an arrangement of a recording and reproducing apparatus according to a fourth embodiment of the present invention.
Figure 6:
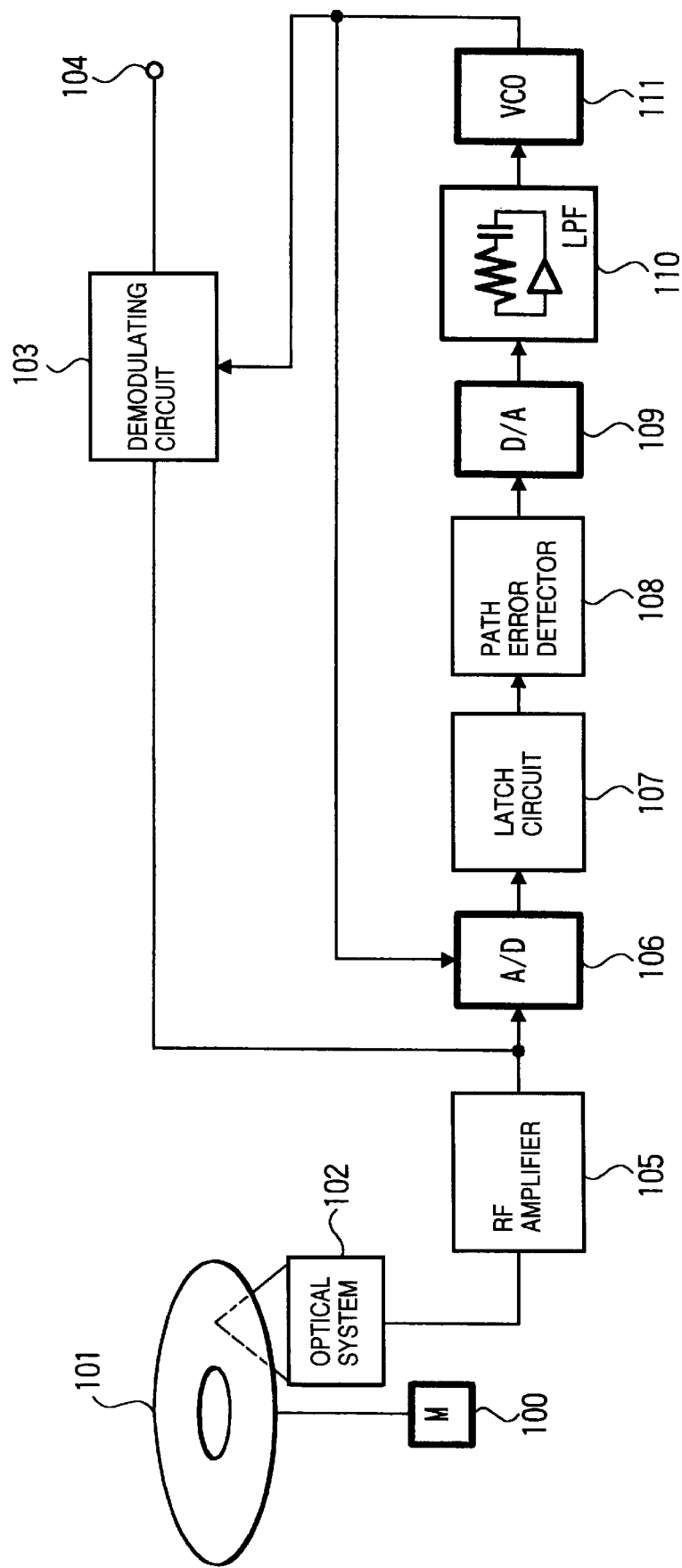
FIG. 6 is a diagram showing an arrangement of a recording and reproducing apparatus according to the prior art.

While the recording and reproducing apparatus of the third embodiment has the upper-limit value changing means for changing the upper-limit value in response to the position information of the optical system 2 in addition to the arrangement of the recording and reproducing apparatus of the first embodiment, as shown in FIG. 5, the zero setting circuit 61 and the selector 62 employed in the recording and reproducing apparatus of the second embodiment may be provided in addition to the above arrangement (the recording and reproducing apparatus of the fourth embodiment).

In this case, the recording and reproducing apparatus of the fourth embodiment enjoys an effect that when the external disturbance resulting from the defect on the magneto-optical disk D increases the value of the phase error detection data Dp output from the phase error detector 13, it is possible to avoid the operation of recording data on the magneto-optical disk D by using an abnormal reference clock P (i.e., an abnormal channel clock Pc), an effect that the time (correction time) required to precisely generate the reference clock when the servo pattern is normally detected can be shortened, and an effect that it is possible to prevent probability (frequency) that the data is inhibited from being recorded on the magneto-optical disk D from being increased beyond necessity.

While the servo pattern recorded on the magneto-optical disk D is formed of the wobble pits WP1 and WP2, the servo pattern is not limited thereto and may be formed of any pattern which can be recognized as a servo pattern thorough a physical phenomenon (light, magnetism, electricity and so on) other than the wobble pits WP1, WP2.

While the reference clock generating circuit 6 is formed of the PLL digitally operated, the reference clock generating circuit 6 may be formed of the PLL operated in an analog fashion.

While the reference clock generating circuit 6 generates the reference clock P by detecting the servo pattern from the magneto-optical disk D where only the servo pattern is recorded in the form of pits, the reference clock generating circuit may generate the reference clock P by detecting a servo pattern from an optical disk where not only servo pattern but also recording data are recorded in the form of pits, a phase change type optical disk where a bit data is recorded by using crystallinity/noncrystallinity of a recording layer, and a magnetic disk where the servo pattern is recorded by using magnetism.

Therefore, the recording and reproducing apparatus according to first to fourth embodiments can employ, as the disk-like recording medium, the optical disk, the phase-change type optical disk and the magnetic disk other than the magneto-optical disk d.

What is claimed is:

1. A disk apparatus comprising:

rotationary driving means for rotationary driving a disk;

data recording/reproducing means which has a head which can be moved in the radius direction of said disk for recording or reproducing data on or from said disk;

reference clock information generating means for generating a reference clock information utilized when data is recorded on or reproduced from said disk;

clock control means for generating a phase error information indicative of a phase error between a phase information obtained upon rotation of said disk, and said reference clock information and for controlling said reference clock generating means based on said phase error information;

threshold value discriminating means for discriminating whether or not said phase error exceeds a predetermined threshold value; and data recording/reproduction control means for controlling said data recording/reproducing means based on an output result of said threshold value discriminating means.

2. The apparatus of claim 1 wherein when said threshold value discriminating means determines that said phase error exceeds said threshold value, said data recording/reproduction control means outputs a recording inhibit command to said data recording/reproducing means.

3. The apparatus of claim 2 wherein said disk comprises a sample servo area where servo information is recorded and a user data area where a user data is recorded, and said phase information is generated based on said servo information recorded in said sample servo area.

4. The apparatus of claim 3 wherein a first threshold value employed when said head is located at a first position is larger than a second threshold value employed when it is located at a second position displaced from said first position toward an outer periphery side of said disk in the radial direction.

5. The apparatus of claim 4, further comprising:

position information detecting means for detecting a position of said head relative to said disk to output a position information; and threshold value setting means for changing said threshold value in response to said position information.

6. The apparatus of claim 5 wherein said position information detecting means is a position sensor for detecting a position of said head relative to said disk.

7. The apparatus of claim 6 wherein an address information indicative of an address of data is recorded on said disk, and said position information detecting means detects the position of said head relative to said disk based on said address information.

8. The apparatus of claim 7 wherein said data recording/reproduction control means comprises:

data write control means for outputting a recording enable signal to said data recording/reproducing means when data is to be recorded on said disk; and enable signal output inhibit means for inhibiting transmission of said recording enable signal from said data write control means to data recording/reproducing means when said threshold value discriminating means determines that said phase error exceeds said threshold value.

9. The apparatus of claim 1 wherein said disk comprises a sample servo area where servo information is recorded and a user data area where a user data is recorded, and said phase information is generated based on said servo information recorded in said sample servo area.

10. The apparatus of claim 9 wherein a first threshold value employed when said head is located at a first position is larger than a second threshold value employed when it is located at a second position displaced from said first position toward an outer periphery side of said disk in the radial direction.

11. The apparatus of claim 10, further comprising:

position information detecting means for detecting a position of said head relative to said disk to output a position information; and threshold value setting means for changing said threshold value in response to said position information.

12. The apparatus of claim 11 wherein said position information detecting means is a position sensor for detecting a position of said head relative to said disk.

13. The apparatus of claim 12 wherein an address information indicative of an address of data is recorded on said disk, and said position information detecting means detects the position of said head relative to said disk based on said address information.

14. The apparatus of claim 13 wherein said data recording/reproduction control means comprises:

data write control means for outputting a recording enable signal to said data recording/reproducing means when data is to be recorded on said disk; and enable signal output inhibit means for inhibiting transmission of said recording enable signal from said data write control means to data recording/reproducing means when said threshold value discriminating means determines that said phase error exceeds said threshold value.

15. The apparatus of claim 9, further comprising:

position information detecting means for detecting a position of said head relative to said disk to output a position information; and threshold value setting means for changing said threshold value in response to said position information.

16. The apparatus of claim 15 wherein said position information detecting means is a position sensor for detecting a position of said head relative to said disk.

17. The apparatus of claim 16 wherein an address information indicative of an address of data is recorded on said disk, and said position information detecting means detects the position of said head relative to said disk based on said address information.

18. The apparatus of claim 11 wherein said data recording/reproduction control means comprises:

data write control means for outputting a recording enable signal to said data recording/reproducing means when data is to be recorded on said disk; and enable signal output inhibit means for inhibiting transmission of said recording enable signal from said data write control means to data recording/reproducing means when said threshold value discriminating means determines that said phase error exceeds said threshold value.

19. The apparatus of claim 1, further comprising:

position information detecting means for detecting a position of said head relative to said disk to output a position information; and threshold value setting means for changing said threshold value in response to said position information.

20. The apparatus of claim 19, wherein said position information detecting means is a position sensor for detecting a position of said head relative to said disk.

21. The apparatus of claim 20 wherein an address information indicative of an address of data is recorded on said disk, and said position information detecting means detects the position of said head relative to said disk based on said address information.

22. The apparatus of claim 21 wherein said data recording/reproduction control means comprises:
data write control means for outputting a recording enable signal to said data recording/reproducing means when data is to be recorded on said disk; and
enable signal output inhibit means for inhibiting transmission of said recording enable signal from said data write control means to data recording/reproducing means when said threshold value discriminating means determines that said phase error exceeds said threshold value.

23. The apparatus of claim 19, wherein an address information indicative of an address of data is recorded on said disk, and said position information detecting means detects the position of said head relative to said disk based on said address information.

24. The apparatus of claim 19 wherein said data recording/reproduction control means comprises:
data write control means for outputting a recording enable signal to said data recording/reproducing means when data is to be recorded on said disk; and
enable signal output inhibit means for inhibiting transmission of said recording enable signal from said data write control means to data recording/reproducing means when said threshold value discriminating means determines that said phase error exceeds said threshold value.

25. The apparatus of claim 1, further comprising:
recording/reproducing clock generating means for generating a recording/reproducing clock used as a reference when data is recorded or reproduced based on said reference clock information;
clock frequency information outputting means for detecting a clock frequency of said recording/reproducing clock to output a recording/reproduction clock frequency information; and
a threshold setting means for changing said threshold value based on said recording/reproduction clock frequency information.

26. The apparatus of claim 25 wherein said data recording/reproduction control means comprises:
data write control means for outputting a recording enable signal to said data recording/reproducing means when data is to be recorded on said disk; and
enable signal output inhibit means for inhibiting transmission of said recording enable signal from said data write control means to data recording/reproducing means when said threshold value discriminating means determines that said phase error exceeds said threshold value.

27. The apparatus of claim 1, further comprising zero setting means for, when said threshold value discriminating means determines that said phase error exceeds a predetermined threshold value, setting said phase error to zero during a predetermined time.

28. The apparatus of claim 27 wherein said disk comprises a sample servo area where servo information is recorded and a user data area where a user data is recorded, and said phase information is generated based on said servo information recorded in said sample servo area.

29. The apparatus of claim 28 wherein a first threshold value employed when said head is located at a first position is larger than a second threshold value employed when it is located at a second position displaced from said first position toward an outer periphery side of said disk in the radial direction.

30. The apparatus of claim 29, further comprising:
position information detecting means for detecting a position of said head relative to said disk to output a position information; and
threshold value setting means for changing said threshold value in response to said position information.

31. The apparatus of claim 30 wherein said position information detecting means is a position sensor for detecting a position of said head relative to said disk.

32. The apparatus of claim 31 wherein an address information indicative of an address of data is recorded on said disk, and said position information detecting means detects the position of said head relative to said disk based on said address information.

33. The apparatus of claim 32 wherein said data recording/reproduction control means comprises:
data write control means for outputting a recording enable signal to said data recording/reproducing means when data is to be recorded on said disk; and
enable signal output inhibit means for inhibiting transmission of said recording enable signal from said data write control means to data recording/reproducing means when said threshold value discriminating means determines that said phase error exceeds said threshold value.

34. The apparatus of claim 1 wherein said data recording/reproduction control means comprises:
data write control means for outputting a recording enable signal to said data recording/reproducing means when data is to be recorded on said disk; and
enable signal output inhibit means for inhibiting transmission of said recording enable signal from said data write control means to data recording/reproducing means when said threshold value discriminating means determines that said phase error exceeds said threshold value.

35. A disk apparatus, comprising:
a rotationary driving circuit for rotationary driving a disk;
a data recording/reproducing unit which has a head which can be moved in the radius direction of said disk for recording or reproducing data on or from said disk;
a reference clock information generating unit for generating a reference clock information utilized when data is recorded on or reproduced from said disk;
a clock controller for generating a phase error information indicative of a phase error between a phase information obtained upon rotation of said disk, and said reference clock information and for controlling said reference clock information generating unit based on said phase error information;
a threshold value discriminating unit for discriminating whether or not said phase error exceeds a predetermined threshold value; and
a data recording/reproduction controller for controlling said data recording/reproducing unit based on an output result of said threshold value discriminating unit.

36. The apparatus of claim 35 wherein when said threshold value discriminating unit determines that said phase error exceeds said threshold value, said data recording/ reproduction controller outputs a recording inhibit command to said data recording/reproducing unit.

37. The apparatus of claim 36 wherein said disk comprises a sample servo area where servo information is recorded and a user data area where a user data is recorded, and said phase information is generated based on said servo information recorded in said sample servo area.

38. The apparatus of claim 37, further comprising:
   a position information detection unit for detecting a position of said head relative to said disk to output a position information; and
   a threshold value setting unit for changing said threshold value in response to said position information.

39. The apparatus of claim 38 wherein a first threshold value employed when said head is located at a first position is larger than a second threshold value employed when it is located at a second position displaced from said first position toward an outer periphery side of said disk in the radial direction.

40. The apparatus of claim 39 further comprising:
   a zero setting unit for, when said threshold value discriminating unit determines that said phase error exceeds a predetermined threshold value, setting said phase error to zero during a predetermined time.

41. The apparatus of claim 40 wherein said data recording/reproduction control unit comprises:
   a data write controller for outputting a recording enable signal to said data recording/reproducing unit when data is to be recorded on said disk; and
   an enable signal output inhibit unit for inhibiting transmission of said recording enable signal from said data write controller to data recording/reproducing unit when said threshold value discriminating unit determines that said phase error exceeds said threshold value.

42. The apparatus of claim 41 wherein said position information detecting unit is a position sensor for detecting a position of said head relative to said disk.

43. The apparatus of claim 42 wherein an address information indicative of an address of data is recorded on said disk, and said position information detecting unit detects the position of said head relative to said disk based on said address information.

44. The apparatus of claim 36, further comprising:
   a position information detection unit for detecting a position of said head relative to said disk to output a position information; and
   a threshold value setting unit for changing said threshold value in response to said position information.

45. The apparatus of claim 44 wherein said position information detecting unit is a position sensor for detecting a position of said head relative to said disk.

46. The apparatus of claim 45 wherein an address information indicative of an address of data is recorded on said disk, and said position information detecting unit detects the position of said head relative to said disk based on said address information.

47. The apparatus of claim 37, further comprising:
   a recording/reproducing clock generating unit for generating a recording/reproducing clock used as a reference when data is recorded or reproduced based on said reference clock information;
   a clock frequency information outputting unit for detecting a clock frequency of said recording/reproducing clock to output a recording/reproduction clock frequency information; and
   a threshold setting unit for changing said threshold value based on said recording/reproduction clock frequency information.

48. The apparatus of claim 47 wherein a first threshold value employed when said head is located at a first position is larger than a second threshold value employed when it is located at a second position displaced from said first position toward an outer periphery side of said disk in the radial direction.

49. The apparatus of claim 48, further comprising:
   a zero setting unit for, when said threshold value discriminating unit determines that said phase error exceeds a predetermined threshold value, setting said phase error to zero during a predetermined time.

50. The apparatus of claim 49 wherein said data recording/reproduction control unit comprises:
   a data write controller for outputting a recording enable signal to said data recording/reproducing unit when data is to be recorded on said disk; and
   an enable signal output inhibit unit for inhibiting transmission of said recording enable signal from said data write controller to data recording/reproducing unit when said threshold value discriminating unit determines that said phase error exceeds said threshold value.

51. The apparatus of claim 50 wherein said position information detecting unit is a position sensor for detecting a position of said head relative to said disk.

52. The apparatus of claim 51 wherein an address information indicative of an address of data is recorded on said disk, and said position information detecting unit detects the position of said head relative to said disk based on said address information.

53. The apparatus of claim 35 wherein said disk comprises a sample servo area where servo information is recorded and a user data area where a user data is recorded, and said phase information is generated based on said servo information recorded in said sample servo area.

54. The apparatus of claim 53, further comprising:
   a position information detection unit for detecting a position of said head relative to said disk to output a position information; and
   a threshold value setting unit for changing said threshold value in response to said position information.

55. The apparatus of claim 54 wherein a first threshold value employed when said head is located at a first position is larger than a second threshold value employed when it is located at a second position displaced from said first position toward an outer periphery side of said disk in the radial direction.

56. The apparatus of claim 55, further comprising:
   a zero setting unit for, when said threshold value discriminating unit determines that said phase error exceeds a predetermined threshold value, setting said phase error to zero during a predetermined time.

57. The apparatus of claim 56 wherein said data recording/reproduction control unit comprises:
   a data write controller for outputting a recording enable signal to said data recording/reproducing unit when data is to be recorded on said disk; and
   an enable signal output inhibit unit for inhibiting transmission of said recording enable signal from said data write controller to data recording/reproducing unit when said threshold value discriminating unit determines that said phase error exceeds said threshold value.

58. The apparatus of claim 57 wherein said position information detecting unit is a position sensor for detecting a position of said head relative to said disk.

59. The apparatus of claim 58 wherein an address information indicative of an address of data is recorded on said disk, and said position information detecting unit detects the position of said head relative to said disk based on said address information.

60. The apparatus of claim 53, further comprising:
a recording/reproducing clock generating unit for generating a recording/reproducing clock used as a reference when data is recorded or reproduced based on said reference clock information;
a clock frequency information outputting unit for detecting a clock frequency of said recording/reproducing clock to output a recording/reproduction clock frequency information; and
a threshold setting unit for changing said threshold value based on said recording/reproduction clock frequency information.

61. The apparatus of claim 60 wherein a first threshold value employed when said head is located at a first position is larger than a second threshold value employed when it is located at a second position displaced from said first position toward an outer periphery side of said disk in the radial direction.

62. The apparatus of claim 61, further comprising:
a zero setting unit for, when said threshold value discriminating unit determines that said phase error exceeds a predetermined threshold value, setting said phase error to zero during a predetermined time.

63. The apparatus of claim 62 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

64. The apparatus of claim 63 wherein said position information detecting unit is a position sensor for detecting a position of said head relative to said disk.

65. The apparatus of claim 64 wherein an address information indicative of an address of data is recorded on said disk, and said position information detecting unit detects the position of said head relative to said disk based on said address information.

66. The apparatus of claim 35, further comprising:
a position information detection unit for detecting a position of said head relative to said disk to output a position information; and
a threshold value setting unit for changing said threshold value in response to said position information.

67. The apparatus of claim 66 wherein a first threshold value employed when said head is located at a first position is larger than a second threshold value employed when it is located at a second position displaced from said first position toward an outer periphery side of said disk in the radial direction.

68. The apparatus of claim 67, further comprising:
a zero setting unit for, when said threshold value discriminating unit determines that said phase error exceeds a predetermined threshold value, setting said phase error to zero during a predetermined time.

69. The apparatus of claim 68 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

70. The apparatus of claim 69 wherein said position information detecting unit is a position sensor for detecting a position of said head relative to said disk.

71. The apparatus of claim 70 wherein an address information indicative of an address of data is recorded on said disk, and said position information detecting unit detects the position of said head relative to said disk based on said address information.

72. The apparatus of claim 66, further comprising:
a zero setting unit for, when said threshold value discriminating unit determines that said phase error exceeds a predetermined threshold value, setting said phase error to zero during a predetermined time.

73. The apparatus of claim 72 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

74. The apparatus of claim 73 wherein said position information detecting unit is a position sensor for detecting a position of said head relative to said disk.

75. The apparatus of claim 74 wherein an address information indicative of an address of data is recorded on said disk, and said position information detecting unit detects the position of said head relative to said disk based on said address information.

76. The apparatus of claim 66 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

77. The apparatus of claim 76 wherein said position information detecting unit is a position sensor for detecting a position of said head relative to said disk.

78. The apparatus of claim 77 wherein an address information indicative of an address of data is recorded on said disk, and said position information detecting unit detects the position of said head relative to said disk based on said address information.

79. The apparatus of claim 66 wherein said position information detecting unit is a position sensor for detecting a position of said head relative to said disk.

80. The apparatus of claim 79 wherein an address information indicative of an address of data is recorded on said disk, and said position information detecting unit detects the position of said head relative to said disk based on said address information.

81. The apparatus of claim 66 wherein an address information indicative of an address of data is recorded on said disk, and said position information detecting unit detects the position of said head relative to said disk based on said address information.

82. The apparatus of claim 35, further comprising:
a recording/reproducing clock generating unit for generating a recording/reproducing clock used as a reference when data is recorded or reproduced based on said reference clock information;
a clock frequency information outputting unit for detecting a clock frequency of said recording/reproducing clock to output a recording/reproduction clock frequency information; and
a threshold setting unit for changing said threshold value based on said recording/reproduction clock frequency information.

83. The apparatus of claim 82 wherein a first threshold value employed when said head is located at a first position is larger than a second threshold value employed when it is located at a second position displaced from said first position toward an outer periphery side of said disk in the radial direction.

84. The apparatus of claim 83, further comprising:
a zero setting unit for, when said threshold value discriminating unit determines that said phase error exceeds a predetermined threshold value, setting said phase error to zero during a predetermined time.

85. The apparatus of claim 84 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

86. The apparatus of claim 85 wherein said position information detecting unit is a position sensor for detecting a position of said head relative to said disk.

87. The apparatus of claim 86 wherein an address information indicative of an address of data is recorded on said disk, and said position information detecting unit detects the position of said head relative to said disk based on said address information.

88. The apparatus of claim 82, further comprising:
a zero setting unit for, when said threshold value discriminating unit determines that said phase error exceeds a predetermined threshold value, setting said phase error to zero during a predetermined time.

89. The apparatus of claim 88 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

90. The apparatus of claim 89 wherein said position information detecting unit is a position sensor for detecting a position of said head relative to said disk.

91. The apparatus of claim 90 wherein an address information indicative of an address of data is recorded on said disk, and said position information detecting unit detects the position of said head relative to said disk based on said address information.

92. The apparatus of claim 82 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

93. The apparatus of claim 92 wherein said position information detecting unit is a position sensor for detecting a position of said head relative to said disk.

94. The apparatus of claim 93 wherein an address information indicative of an address of data is recorded on said disk, and said position information detecting unit detects the position of said head relative to said disk based on said address information.

95. The apparatus of claim 82, further comprising:
a position information detection unit for detecting a position of said head relative to said disk to output a position information, and
a threshold value setting unit for changing said threshold value in response to said position information.

96. The apparatus of claim 95 wherein said position information detecting unit is a position sensor for detecting a position of said head relative to said disk.

97. The apparatus of claim 96 wherein an address information indicative of an address of data is recorded on said disk, and said position information detecting unit detects the position of said head relative to said disk based on said address information.

98. The apparatus of claim 97 wherein an address information indicative of an address of data is recorded on said disk, and said position information detecting unit detects the position of said head relative to said disk based on said address information.

99. The apparatus of claim 35 wherein a first threshold value employed when said head is located at a first position is larger than a second threshold value employed when it is located at a second position displaced from said first position toward an outer periphery side of said disk in the radial direction.

100. The apparatus of claim 99, further comprising:
a zero setting unit for, when said threshold value discriminating unit determines that said phase error exceeds a predetermined threshold value, setting said phase error to zero during a predetermined time.

101. The apparatus of claim 100 wherein said data recording/reproduction control unit comprises:
a data write controller for outputting a recording enable signal to said data recording/reproducing unit when data is to be recorded on said disk; and
an enable signal output inhibit unit for inhibiting transmission of said recording enable signal from said data write controller to data recording/reproducing unit when said threshold value discriminating unit determines that said phase error exceeds said threshold value.

102. The apparatus of claim 101, further comprising:
- a position information detection unit for detecting a position of said head relative to said disk to output a position information; and
- a threshold value setting unit for changing said threshold value in response to said position information.

103. The apparatus of claim 102 wherein said position information detecting unit is a position sensor for detecting a position of said head relative to said disk.

104. The apparatus of claim 103 wherein an address information indicative of an address of data is recorded on said disk, and said position information detecting unit detects the position of said head relative to said disk based on said address information.

105. The apparatus of claim 35, further comprising:
- a zero setting unit for, when said threshold value discriminating unit determines that said phase error exceeds a predetermined threshold value, setting said phase error to zero during a predetermined time.

106. The apparatus of claim 105 wherein said data recording/reproduction control unit comprises:
- a data write controller for outputting a recording enable signal to said data recording/reproducing unit when data is to be recorded on said disk; and
- an enable signal output inhibit unit for inhibiting transmission of said recording enable signal from said data write controller to data recording/reproducing unit when said threshold value discriminating unit determines that said phase error exceeds said threshold value.

107. The apparatus of claim 106, further comprising:
- a position information detection unit for detecting a position of said head relative to said disk to output a position information; and
- a threshold value setting unit for changing said threshold value in response to said position information.

108. The apparatus of claim 107 wherein said position information detecting unit is a position sensor for detecting a position of said head relative to said disk.

109. The apparatus of claim 108 wherein an address information indicative of an address of data is recorded on said disk, and said position information detecting unit detects the position of said head relative to said disk based on said address information.

110. The apparatus of claim 35 wherein said data recording/reproduction control unit comprises:
- a data write controller for outputting a recording enable signal to said data recording/reproducing unit when data is to be recorded on said disk; and
- an enable signal output inhibit unit for inhibiting transmission of said recording enable signal from said data write controller to data recording/reproducing unit when said threshold value discriminating unit determines that said phase error exceeds said threshold value.

111. The apparatus of claim 110, further comprising:
- a position information detection unit for detecting a position of said head relative to said disk to output a position information; and
- a threshold value setting unit for changing said threshold value in response to said position information.

112. The apparatus of claim 111 wherein said position information detecting unit is a position sensor for detecting a position of said head relative to said disk.

113. The apparatus of claim 112 wherein an address information indicative of an address of data is recorded on said disk, and said position information detecting unit detects the position of said head relative to said disk based on said address information.

114. A recording method for a disk apparatus for controlling, based on a phase information obtained upon rotation of a disk which is rotated and a clock information used for recording data, a phase of said clock information and for recording data on said disk, said method comprising the steps of:
- discriminating whether or not a phase error exceeds a predetermined value; and
- inhibiting data from being recorded on said disk when it is discriminated in said discriminating step that said phase error exceeds said threshold value.

115. A recording or reproducing method for a disk apparatus for controlling, based on a phase information obtained upon rotation of a disk which is rotated and a clock information used for recording data, a phase of said clock information and for recording or reproducing data on or from said disk, said method comprising the steps of:
- discriminating whether or not a phase error exceeds a predetermined value;
- controlling said disk apparatus based on a discrimination result obtained in said step of discriminating;
  - wherein when it is determined in said discrimination step that said phase error exceeds a threshold, in said control step, said disk apparatus is controlled by setting said phase error to zero during a predetermined time.

116. The method of claim 115, wherein a first threshold value employed when a data recording means is located at a first position is changed so as to become larger than a second threshold value employed when it is located at a second position displaced from said first position toward an outer periphery side of said disk in a radial direction.

117. The method of claim 116 wherein said disk comprises a sample servo area where servo information is recorded and a user data area where user data is to be recorded, and wherein there are provided a reading step of reading a servo information recorded in said sample servo area and a phase information generating step of generating said phase information based on said servo information.

118. The method of claim 115 wherein said disk comprises a sample servo area where servo information is recorded and a user data area where user data is to be recorded, and wherein there are provided a reading step of reading a servo information recorded in said sample servo area and a phase information generating step of generating said phase information based on said servo information.

119. A recording or reproducing method for a disk apparatus for controlling, based on a phase information obtained upon rotation of a disk which is rotated and a clock information used for recording data, a phase of said clock information and for recording or reproducing data on or from said disk, said method comprising the steps of:
- discriminating whether or not a phase error exceeds a predetermined value;
- controlling said disk apparatus based on a discrimination result obtained in said step of discriminating;
- detecting an access position of an access means relative to said disk to output an access position information; and
- changing a threshold value based on said access position information.

120. The method of claim 18 wherein a first threshold value employed when a data re cording means is located at a first position is changed so as to become larger than a second threshold value employed when it is located at a second position displaced from said first position toward an outer periphery side of said disk in the radial direction.

121. The method of claim 120 wherein when it is determined in said discrimination step that said phase error exceeds a threshold, in said control step, said disk apparatus is controlled by setting said phase error to zero during a predetermined time.

122. The method of claim 121 wherein said disk comprises a sample servo area where servo information is recorded and a user data area where user data is to be recorded, And wherein there are provided a reading step of reading a servo information recorded in said sample servo area and a phase information generating step of generating said phase information based on said servo information.

123. The method of claim 119 wherein when it is determined in said discrimination step that said phase error exceeds a threshold, in said control step, said disk apparatus is controlled by setting said phase error to zero during a predetermined time.

124. The method of claim 123 wherein said disk comprises a sample servo area where servo information is recorded and a user data area where user data is to be recorded, and wherein there are provided a reading step of reading a servo information recorded in said sample servo area and a phase information generating step of generating said phase information based on said servo information.

125. The method of claim 119 wherein said disk comprises a sample servo area where servo information is recorded and a user data area where user data is to be recorded, and wherein there are provided a reading step of reading a servo information recorded in said sample-servo area and a phase information generating step of generating said phase information based on said servo information.

126. A recording or reproducing method for a disk apparatus for controlling, based on a phase information obtained upon rotation of a disk which is rotated and a clock information used for recording data, a phase of said clock information and for recording or reproducing data on or from said disk, said method comprising the steps of:
   discriminating whether or not a phase error exceeds a predetermined value;
   controlling said disk apparatus based on a discrimination result obtained in said step of discriminating;
   generating a recording/reproduction clock used as a reference when data is recorded and reproduced, based on a reference clock information;
   detecting a clock frequency of said recording/reproduction clock to output a recording/reproduction clock frequency information; and
   changing a threshold value based on said recording/reproduction clock frequency information.

127. The method of claim 126 wherein a first threshold value employed when a data recording means is located at a first position is changed so as to become larger than a second threshold value employed when it is located at a second position displaced from said first position toward an outer periphery side of said disk in a radial direction.

128. The method of claim 127 wherein said disk comprises a sample servo area where servo information is recorded and a user data area where user data is to be recorded, and wherein there are provided a reading step of reading a servo information recorded in said sample servo area and a phase information generating step of generating said phase information based on said servo information.

129. The method of claim 126 wherein said disk comprises a sample servo area where servo information is recorded and a user data area where user data is to be recorded, and wherein there are provided a reading step of reading a servo information recorded in said sample servo area and a phase information generating step of generating said phase information based on said servo information.

130. A disk apparatus providing method, comprising the steps of:
   rotationarily driving a disk;
   providing data recording/reproducing means which has a head which can be moved in a radial direction of said disk for recording or reproducing data on or from said disk;
   generating a reference clock information utilized when data is recorded on or reproduced from said disk;
   generating a phase error information indicative of a phase error between a phase information obtained upon rotation of said disk, and said reference clock information and for controlling said step of generating said reference clock based on said phase error information;
   discriminating whether or not said phase error exceeds a predetermined threshold value; and
   controlling said step of providing said data recording/reproducing means based on an output result of said discriminating step.

131. The method of claim 130 wherein when said discriminating step determines that said phase error exceeds said threshold value, said controlling step outputs a recording inhibit command.

132. The method of claim 131, further including the step of setting said phase error to zero during a predetermined time when said discriminating step determines that said phase error exceeds a predetermined threshold valve.

133. The method of claim 132 wherein said disk comprises a sample servo area where servo information is recorded and a user data area where a user data is recorded, and said phase information is generated based on said servo information recorded in said sample servo area.

134. The method of claim 133 wherein a first threshold value employed when said head is located at a first position is larger than a second threshold value employed when it is located at a second position displaced from said first position toward an outer periphery side of said disk in the radial direction.

135. The method of claim 134, further comprising the steps of:
   detecting a position of said head relative to said disk to output a position information; and
   changing said threshold value in response to said position information.

136. The method of claim 135 wherein said detecting step includes the step of providing a position sensor for detecting a position of said head relative to said disk.

137. The method of claim 136 wherein an address information indicative of an address of data is recorded on said disk, and said detecting step detects the position of said head relative to said disk based on said address information.

138. The method of claim 137 wherein said step of controlling includes the steps of:
   outputting a recording enable signal to said step of providing said data recording/reproducing means when data is to be recorded on said disk; and
   inhibiting transmission of said recording enable signal from said outputting step to said step of providing said data recording/reproducing means when said discriminating step determines that said phase error exceeds said threshold value.

139. The method of claim 131 wherein said disk comprises a sample servo area where servo information is recorded and a user data area where a user data is recorded, and said phase information is generated based on said servo information recorded in said sample servo area.

140. The method of claim 139 wherein a first threshold value employed when said head is located at a first position is larger than a second threshold value employed when it is located at a second position displaced from said first position toward an outer periphery side of said disk in the radial direction.

141. The method of claim 140, further comprising the steps of:
detecting a position of said head relative to said disk to output a position information; and
changing said threshold value in response to said position information.

142. The method of claim 141 wherein said detecting step includes the step of providing a position sensor for detecting a position of said head relative to said disk.

143. The method of claim 142 wherein an address information indicative of an address of data is recorded on said disk, and said detecting step detects the position of said head relative to said disk based on said address information.

144. The method of claim 143 wherein said step of controlling includes the steps of:
outputting a recording enable signal to said step of providing said data recording/reproducing means when data is to be recorded on said disk; and
inhibiting transmission of said recording enable signal from said outputting step to said step of providing said data recording/reproducing means when said discriminating step determines that said phase error exceeds said threshold value.

145. The method of claim 130 wherein said disk comprises a sample servo area where servo information is recorded and a user data area where a user data is recorded, and said phase information is generated based on said servo information recorded in said sample servo area.

146. The method of claim 145 wherein a first threshold value employed when said head is located at a first position is larger than a second threshold value employed when it is located at a second position displaced from said first position toward an outer periphery side of said disk in the radial direction.

147. The method of claim 146, further comprising the steps of:
detecting a position of said head relative to said disk to output a position information; and
changing said threshold value in response to said position information.

148. The method of claim 147 wherein said detecting step includes the step of providing a position sensor for detecting a position of said head relative to said disk.

149. The method of claim 148 wherein an address information indicative of an address of data is recorded on said disk, and said detecting step detects the position of said head relative to said disk based on said address information.

150. The method of claim 149 wherein said step of controlling includes the steps of:
outputting a recording enable signal to said step of providing said data recording/reproducing means when data is to be recorded on said disk; and
inhibiting transmission of said recording enable signal from said outputting step to said step of providing said data recording/reproducing means when said discriminating step determines that said phase error exceeds said threshold value.

151. The method of claim 145, further comprising the steps of:
detecting a position of said head relative to said disk to output a position information; and
changing said threshold value in response to said position information.

152. The method of claim 151 wherein said detecting step includes the step of providing a position sensor for detecting a position of said head relative to said disk.

153. The method of claim 152 wherein an address information indicative of an address of data is recorded on said disk, and said detecting step detects the position of said head relative to said disk based on said address information.

154. The method of claim 153 wherein said step of controlling includes the steps of:
outputting a recording enable signal to said step of providing said data recording/reproducing means when data is to be recorded on said disk; and
inhibiting transmission of said recording enable signal from said outputting step to said step of providing said data recording/reproducing means when said discriminating step determines that said phase error exceeds said threshold value.

155. The method of claim 130, further comprising the steps of:
detecting a position of said head relative to said disk to output a position information; and
changing said threshold value in response to said position information.

156. The method of claim 155 wherein said detecting step includes the step of providing a position sensor for detecting a position of said head relative to said disk.

157. The method of claim 156 wherein an address information indicative of an address of data is recorded on said disk, and said detecting step detects the position of said head relative to said disk based on said address information.

158. The method of claim 157 wherein said step of controlling includes the steps of:
outputting a recording enable signal to said step of providing said data recording/reproducing means when data is to be recorded on said disk; and inhibiting transmission of said recording enable signal from said outputting step to said step of providing said data recording/reproducing means when said discriminating step determines that said phase error exceeds said threshold value.

159. The method of claim 155 wherein an address information indicative of an address of data is recorded on said disk, and said detecting step detects the position of said head relative to said disk based on said address information.

160. The method of claim 159 wherein said step of controlling includes the steps of:
outputting a recording enable signal to said step of providing said data recording/reproducing means when data is to be recorded on said disk; and
inhibiting transmission of said recording enable signal from said outputting step to said step of providing said data recording/reproducing means when said discriminating step determines that said phase error exceeds said threshold value.

161. The method of claim 155 wherein said step of controlling includes the steps of:

outputting a recording enable signal to said step of providing said data recording/reproducing means when data is to be recorded on said disk; and inhibiting transmission of said recording enable signal from said outputting step to said step of providing said data recording/reproducing means when said discriminating step determines that said phase error exceeds said threshold value.

162. The method of claim 130, further comprising the steps of:

generating a recording/reproducing clock used as a reference when data is recorded or reproduced based on said reference clock information; detecting a clock frequency of said recording/reproducing clock to output a recording/reproduction clock frequency information; and changing said threshold value based on said recording/reproduction clock frequency information.

163. The method of claim 162 wherein said step of controlling includes the steps of:

outputting a recording enable signal to said step of providing said data recording/reproducing means when data is to be recorded on said disk; and inhibiting transmission of said recording enable signal from said outputting step to said step of providing said data recording/reproducing means when said discriminating step determines that said phase error exceeds said threshold value.

164. The method of claim 130 wherein said step of controlling includes the steps of:

outputting a recording enable signal to said step of providing said data recording/reproducing means when data is to be recorded on said disk; and inhibiting transmission of said recording enable signal from said outputting step to said step of providing said data recording/reproducing means when said discriminating step determines that said phase error exceeds said threshold value.

* * * * *